US007330555B2

United States Patent
Suzuki

(10) Patent No.: US 7,330,555 B2
(45) Date of Patent: Feb. 12, 2008

(54) CODING DEVICE AND METHOD, AND RECORDING MEDIUM

(75) Inventor: Shiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 851 days.

(21) Appl. No.: 10/145,831

(22) Filed: May 14, 2002

(65) Prior Publication Data

US 2002/0198615 A1 Dec. 26, 2002

(30) Foreign Application Priority Data

May 18, 2001 (JP) ............................ P2001-150042

(51) Int. Cl.
*H04B 1/00* (2006.01)
*H04B 14/04* (2006.01)
*H04B 14/06* (2006.01)
*H04R 5/00* (2006.01)
*G10L 19/00* (2006.01)
*G10L 21/00* (2006.01)

(52) U.S. Cl. ........................ 381/119; 381/20; 381/21; 381/22; 381/23; 704/500; 704/501; 375/242; 375/243; 375/245

(58) Field of Classification Search ............ 381/22–23, 381/20–21, 119; 704/500–504; 375/242, 375/243, 245, 260
See application file for complete search history.

(56) References Cited

U.S. PATENT DOCUMENTS

| 3,860,873 | A | * | 1/1975 | Ringstad ..................... 370/483 |
| 5,625,749 | A | * | 4/1997 | Goldenthal et al. ......... 704/254 |
| 5,636,324 | A | * | 6/1997 | Teh et al. .................... 704/226 |
| 6,356,211 | B1 | * | 3/2002 | Shimoyoshi et al. ......... 341/50 |

* cited by examiner

*Primary Examiner*—Vivian Chin
*Assistant Examiner*—Douglas Suthers
(74) *Attorney, Agent, or Firm*—Sonnenschein Nath & Rosenthal LLP

(57) ABSTRACT

An L-channel signal and an R-channel signal are input into a subtractor in which the difference between the L-channel signal and the R-channel signal is determined. The resulting signal is input into first and second multipliers. In the first multiplier, a mixed output signal is generated by using the channel mixture ratio calculated in a previous frame. In the second multiplier, a mixed output signal is generated by using the channel mixture ratio calculated in a current frame. The mixed output signals from the first and second multipliers respectively undergo spectrum transform in first and second spectrum transformers, and quantized in first and second quantizers. A comparator compares a quantization error in the first quantizer with that in the second quantizer. If the quantization error in the second quantizer is greater than that in the first quantizer by a predetermined factor, the comparator controls a switch to select the output of the first quantizer.

48 Claims, 15 Drawing Sheets

| FRAME | R_m | (1−R_m)/(1+R_m)/2 | CHANNEL-B SIGNAL |
|---|---|---|---|
| J − 1 | 0.000 | (1.0)/(1.0)/2 = 0.5 | (L−R)×0.5 |
| J | 0.125 | (0.875)/(1.125)/2 ≒ 0.4 | (L−R)×0.4 |
| J + 1 | 0.250 | (0.750)/(1.250)/2 ≒ 0.3 | (L−R)×0.3 |
| J + 2 | 0.500 | (0.500)/(1.500)/2 ≒ 0.2 | (L−R)×0.2 |

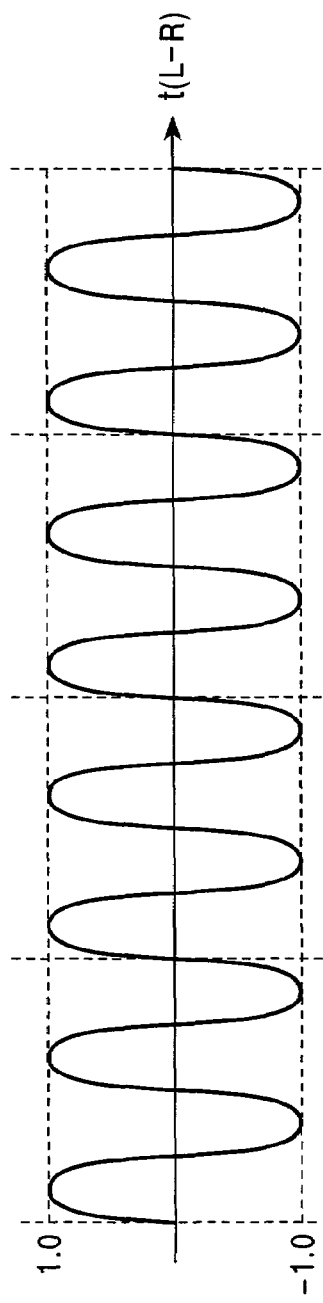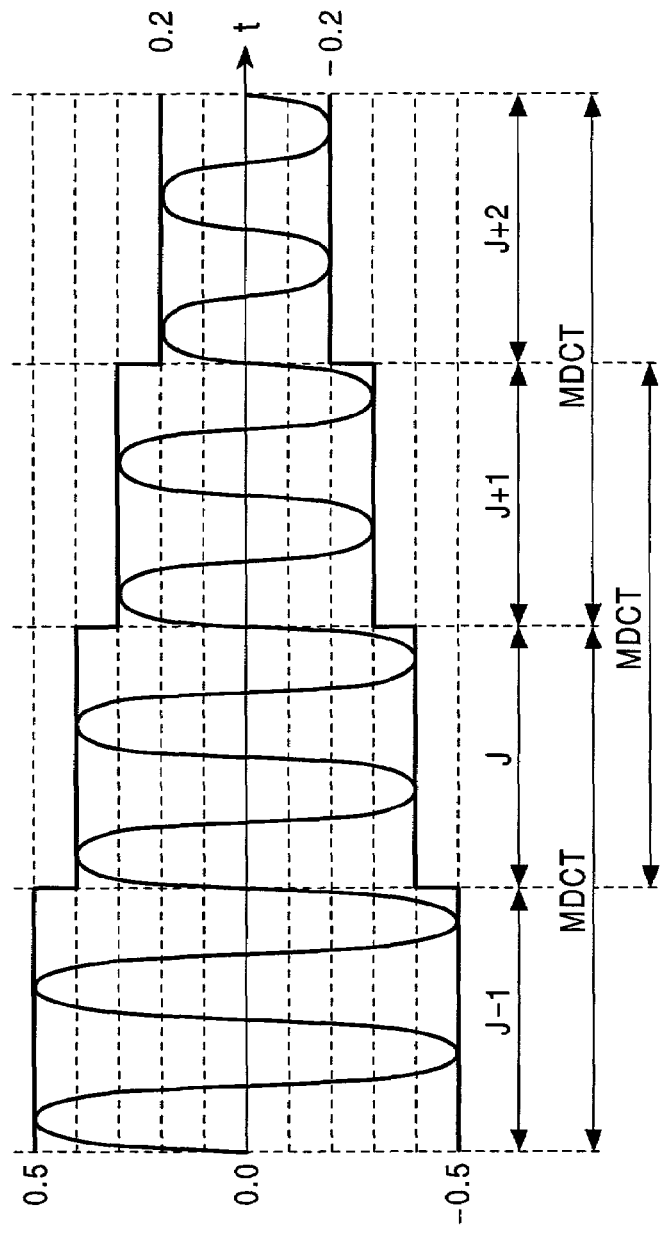
FIG. 10A
FIG. 10B

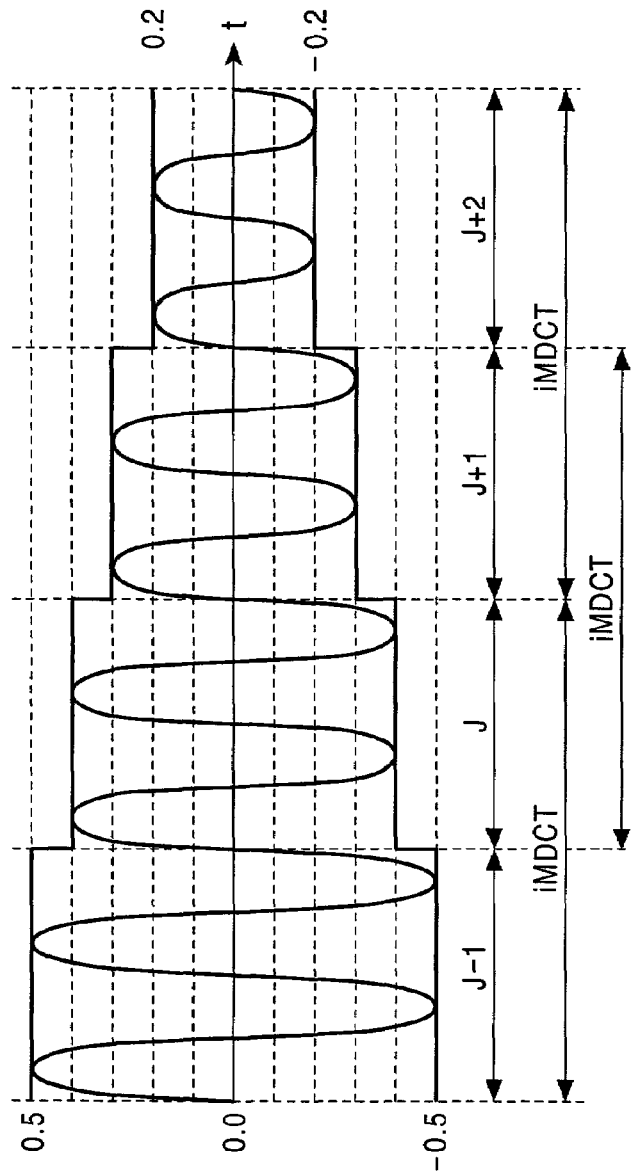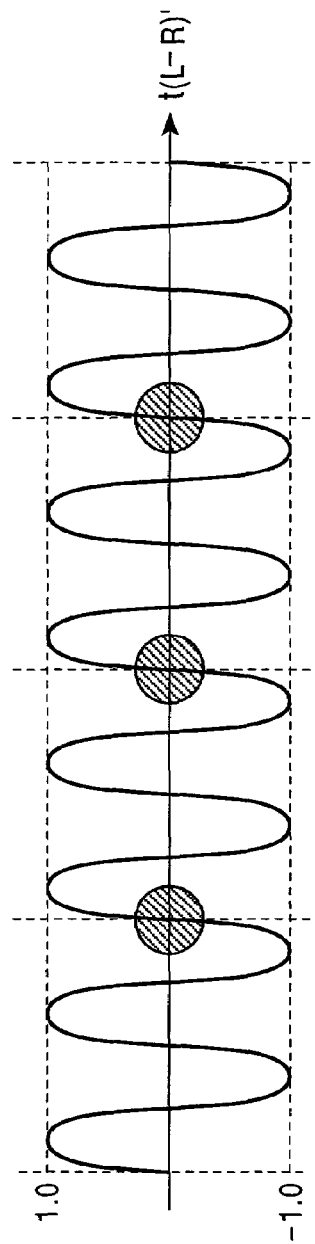
FIG. 12A
FIG. 12B

CODING DEVICE AND METHOD, AND RECORDING MEDIUM

RELATED APPLICATION DATA

The present application claims priority to Japanese Application(s) No(s). P2001-150042 filed May 18, 2001, which application(s) is/are incorporated herein by reference to the extent permitted by law.

BACKGROUND OF THE INVENTION

1. Field of the Invention

The present invention relates to a coding device and method which are suitable for coding an input signal with high efficiency, and transmitting, recording, playing back, and decoding the coded signal so as to obtain a playback signal. The invention also relates to a recording medium in which a coded signal is recorded.

2. Description of the Related Art

Various techniques for coding signals representing acoustic information or audio information (hereinafter simply referred to as "audio signals") with high efficiency are known. For example, a block frequency-band division technique, i.e., a so-called "transform coding technique", is known. In this technique, a time-domain audio signal is formed into blocks in predetermined time units, and a time-domain signal for each block is transformed into a frequency-domain signal (spectrum transform) so as to be divided into a plurality of frequency bands. The signal in each band is then coded. Another method, a non-block frequency-band division technique, i.e., a so-called "sub-band coding (SBC) technique", is known in which a time-domain audio signal is divided into a plurality of frequency bands without being formed into blocks, and a frequency-domain audio signal is then coded. Another high-efficiency coding technique, which is a combination of the above-described sub-band coding technique and the transform coding technique, has been considered. In this case, for example, an audio signal is divided into a plurality of frequency bands according to the sub-band coding technique, the signal for each frequency band undergoes spectrum transform into a frequency-domain signal, and each spectrum-transformed frequency band signal is coded.

The above-described coding techniques are applicable to an audio signal consisting of a plurality of channels. More specifically, the coding techniques are applicable to each channel of the audio signal, for example, to an L channel corresponding to a left speaker, and to an R channel corresponding to a right speaker. The coding techniques can also be used for a signal obtained by adding an L-channel signal and an R-channel signal, i.e., an (L+R)/2 signal. Also, an (L+R)/2 signal and an (L−R)/2 signal can be coded by using the above-described coding techniques. The amount of data required for coding a single channel signal is one half the amount of data required for independently coding signals for two channels. Accordingly, the following standards are defined for recording a signal on a recording medium. Two modes are provided: a one-channel monaural recording mode and a two-channel stereo recording mode, and when a long recording time is required, monaural recording is performed.

In addition to the above-described techniques, other high-efficiency coding techniques are being developed, and by adopting the standards integrating new coding techniques, a longer recording time can be achieved, and higher-quality audio signals can be recorded with the same recording time.

In this case, when determining the above-described standards, by considering changes or extensions to the standards in the future, a space is often reserved on a recording medium for recording, for example, flag information concerning the standards. More specifically, for example, when the standards are initially decided, "0" is recorded as one-bit flag information, and when the standards are changed, "1" is recorded into the flag information. A playback apparatus which is compatible with the new standards checks whether the flag information indicates "0" or "1", and if the flag information indicates "1", a signal is read and played back from the recording medium according to the new standards. If the flag information indicates "0", a signal is read and played back from the recording medium according to the previous standards on the condition that the corresponding playback apparatus is compatible with the previous standards. If the playback apparatus is not compatible with the previous standards, the signal is not played back.

The assignee of the invention of this application has disclosed the following method in the specification and the drawings of Japanese Unexamined Patent Application Publication No. Hei 10-302405. In this method, when coding a multi-channel signal by an encoder in units of frames whose size cannot be controlled, the following arrangement is used. A channel signal to be coded by predetermined standards (hereinafter referred to as "old standards") is temporarily coded with a number of bits smaller than the maximum number of bits which can be allocated into the corresponding frame. Then, a signal of another channel to be coded is disposed in a space in the frame, thereby enabling a playback apparatus which is compatible with the old standards (such an apparatus is hereinafter referred to as an "old-standard playback apparatus") to play back signals of less channels. Additionally, by using a playback apparatus compatible with new standards (such an apparatus is hereinafter referred to as a "new-standard playback apparatus"), signals of a greater number of channels can be played back.

According to this technique, a channel signal which cannot be played back in the old-standard playback apparatus can be coded according to a coding technique with higher efficiency than that of the old standards, thereby preventing a decrease in the audio quality caused by the coding of a multi-channel signal. In this method, signal A=(L+R)/2 is recorded in an area which can be played back by the old-standard playback apparatus, and signal B=(L−R)/2 is recorded in an area which cannot be played back by the old-standard playback apparatus. As a result, the monaural signal A can be played back by the old-standard playback signal, while stereo signals L and R can be played back from the channels A and B by the new-standard playback apparatus.

The same assignee has also disclosed the following method in the specification and the drawings of International Patent Publication WO98/46045. A signal recorded in an area which cannot be played back by an old-standard playback apparatus is selected from (L−R)/2, L, and R, thereby reducing the influence of quantization errors which cause problems when performing coding.

As described above, signals of more channels can be played back by extending the standards, and the standards can be extended by using a signal coding device which enables an old-standard playback apparatus to play back signals of less channels, and then, a stereo signal is played back. In this case, when the stereo signal is played back, quantization errors caused by the coding operation sometimes become problematic according to the type of stereo signal.

Thus, the same assignee has disclosed the following technique in Japanese Unexamined Patent Application Publication No. Hei 11-32399 (hereinafter referred to as "document 1"). The mixture ratio of a plurality of channel signals is calculated, and the channel signals are mixed at regular intervals (frames) based on the calculated mixture ratio. Then, a plurality of processing signals corresponding to the plurality of channel signals are generated from the mixed channel signals, and each of the processing signals is coded. With this arrangement, the influence of quantization errors caused by the coding and decoding operation on the audio quality can be reduced.

In the coding device disclosed in document 1, stereo signals L and R are mixed at a channel mixture ratio $R\_m$ to generate channel A and channel B, which are expressed by the following equations (1) and (2), respectively.

$$A=(L+R)/2 \quad (1)$$

$$B=(L-R)(1-R\_m)(1+R\_m)/2 \quad (2)$$

In equation (2), $R\_m$ is calculated based on a correlation coefficient $R\_c$ indicated in the following equation (3):

$$R\_c=S\_lr/(S\_l*S\_r) \quad (3)$$

where $S\_l$ and $S\_r$ indicate the standard deviations of the L channel and the R channel, respectively; and $S\_lr$ represents the covariance of the L and R channels. When the increases/decreases of both the channels are equal to each other, the channel correlation coefficient $R\_c$ is 1.0, and conversely, when the increases/decreases are totally opposite, $R\_c$ is −1.0. When the increases/decreases of the two channels do not have any correlation, $R\_c$ is close to 0. That is, when the L and R channels are monaural signals, $R\_c$ is 1.0, and when the L and R channels are 180° out of phase with each other, $R\_c$ is −1.0. For typical stereo signals on the L and R channels, $R\_c$ is 0.5 or greater in most cases.

Based on this channel correlation coefficient $R\_c$, the channel mixture ratio $R\_m$ is determined, and the above-described channel signals A and B are generated based on the channel mixture ratio $R\_m$.

According to document 1, by coding the channel signals A and B generated as described above, the influence of quantization errors caused by coding and decoding the signals A and B on the audio quality can be reduced.

According to the technique disclosed in document 1, however, since the channel mixture ratio $R\_m$ is periodically calculated at regular intervals, audio problems may sometimes occur in an input signal which satisfies predetermined conditions. More specifically, in document 1, the channel mixture ratio is determined in each predetermined zone (frame) in which a spectrum obtained by transforming that zone (frame) is to be coded. That is, the channel mixture ratio $R\_m(j)$ is determined for the j-th frame. Accordingly, when a predetermined waveform continues regularly, discontinuous components are generated in a frame boundary area in the coding device if the channel mixture ratio $R\_m(j)$ is changed for each frame. If the signal having such discontinuous components is quantized and coded, it cannot be faithfully reproduced in the decoding device, thereby increasing quantization errors to such a degree as to be perceived as noise. Examples of an input signal having a regular waveform include single-frequency signals, such as musical instruments, for example, bass instruments, and time signals.

SUMMARY OF THE INVENTION

Accordingly, in view of the above-described background, it is an object of the present invention to provide a coding device and method for effectively preventing noise from being generated in a decoding side by constantly monitoring the characteristics of an input signal for each frame at the coding side, and to provide a recording medium in which a coded signal is recorded.

In order to achieve the above-described object, according to one aspect of the present invention, there is provided a coding device for mixing a plurality of channel signals every predetermined regular zone and for coding a resulting mixed output signal. The coding device includes: a first processor for setting an output coefficient calculated by using a correlation coefficient of the plurality of channel signals, which is determined for a previous zone, as an output coefficient of the mixed output signal for a current zone; a second processor for setting an output coefficient calculated by using a correlation coefficient of the plurality of channel signals, which is determined for the current zone, as the output coefficient of the mixed output signal for the current zone; a first quantizer for quantizing a spectrum signal obtained by performing spectrum transform on the mixed output signal supplied from the first processor; a second quantizer for quantizing a spectrum signal obtained by performing spectrum transform on the mixed output signal supplied from the second processor; a selection controller for controlling the selection of an output of the first quantizer and an output of the second quantizer based on a result of comparing a quantization error in the first quantizer with a quantization error in the second quantizer; and a coder for coding the output of the first quantizer or the output of the second quantizer selected by the selection controller.

In the aforementioned coding device, the selection controller may perform control such that the output of the first quantizer is selected when the quantization error of the second quantizer is greater than the quantization error of the first quantizer by a predetermined factor of the quantization error of the first quantizer.

Thus, in the above-described coding device, the quantization error occurring when the output coefficient calculated by using the correlation coefficient of a plurality of channel signals determined for the previous zone is used as the output coefficient for the current zone is compared with the quantization error occurring when the output coefficient calculated by using the correlation coefficient of the plurality of channel signals determined for the current zone is used. According to the comparison result, the quantized output is selected. With this configuration, the boundary noise at the frame boundary areas can be reduced.

According to another aspect of the present invention, there is provided a coding device for mixing a plurality of channel signals every predetermined regular zone and for coding a resulting mixed output signal. The coding device includes: a determining unit for determining whether it is allowed to change an output coefficient based on regularity of the plurality of channel signals; a processor for setting the output coefficient determined by the determining unit as an output coefficient of the mixed output signal; a quantizer for quantizing a spectrum signal obtained by performing spectrum transform on the mixed output signal supplied from the processor; and a coder for coding the signal quantized by the quantizer.

In the aforementioned coding device, the determining unit may determine that it is not allowed to change the output coefficient when the plurality of channel signals have the regularity, and the determining unit may determine that it is allowed to change the output coefficient when the plurality of channel signals do not have the regularity.

In the aforementioned coding device, when it is determined by the determining unit that it is not allowed to change the output coefficient, the processor may set an output coefficient calculated by using a correlation coefficient of the plurality of channel signals, which is determined for a previous zone, as an output coefficient of the mixed output signal for a current zone. When it is determined by the determining unit that it is allowed to change the output coefficient, the processor may set an output coefficient calculated by using the correlation coefficient of the plurality of channel signals, which is determined for the current zone, as the output coefficient of the mixed output signal for the current zone.

The regularity of the plurality of channel signals may be the regularity of zone lengths, each zone length being between one peak to a subsequent peak in the plurality of channel signals. Alternatively, the regularity may be the regularity of zone lengths, each zone length being between one zero-crossing position to a subsequent zero-crossing position in which each of the plurality of channel signals intersects with a zero level.

Thus, in the above-described coding device, when a plurality of channel signals have the regularity, the output coefficient calculated by using the correlation coefficient of the channel signals determined for the previous zone is used as the output coefficient for the current zone. When the plurality of channel signals do not have the regularity, the output coefficient calculated by using the correlation coefficient of the plurality of channel signals determined for the current zone is used. With this configuration, the boundary noise at the frame boundary areas can be reduced with a small amount of computation.

According to still another aspect of the present invention, there is provided a coding device for mixing a plurality of channel signals every predetermined regular zone and for coding a resulting mixed output signal. The coding device includes: a correlation-coefficient determining unit for determining a new correlation coefficient by averaging a correlation coefficient of the plurality of channel signals for a current zone and at least one of a correlation coefficient of the plurality of channel signals for a past zone and a correlation coefficient of the plurality of channel signals for a future zone; a processor for setting an output coefficient determined from the new correlation coefficient as an output coefficient of the mixed output signal; quantizer for quantizing a spectrum signal obtained by performing spectrum transform on the mixed output signal supplied from the processor; and a coder for coding the signal quantized by the quantizer.

In the aforementioned coding device, a new correlation coefficient is determined by averaging a correlation coefficient for the current zone and a correlation coefficient for a past zone and/or a correlation coefficient for a future zone. Then, the output coefficient calculated by using the new correlation coefficient is set as the output coefficient of the mixed output signal. The mixed output signal is then quantized and coded. With this configuration, variation in the output coefficient can be suppressed, thereby reducing the boundary noise at the frame boundary areas.

According to a further aspect of the present invention, there is provided a coding method for mixing a plurality of channel signals every predetermined regular zone and for coding a resulting mixed output signal. The coding method includes: a first processing step of setting an output coefficient calculated by using a correlation coefficient of the plurality of channel signals, which is determined for a previous zone, as an output coefficient of the mixed output signal for a current zone; a second processing step of setting an output coefficient calculated by using a correlation coefficient of the plurality of channel signals, which is determined for the current zone, as the output coefficient of the mixed output signal for the current zone; a first quantizing step of quantizing a spectrum signal obtained by performing spectrum transform on the mixed output signal supplied from the first processing step; a second quantizing step of quantizing a spectrum signal obtained by performing spectrum transform on the mixed output signal supplied from the second processing step; a selection control step of controlling the selection of an output of the first quantizing step and an output of the second quantizing step based on a result of comparing a quantization error in the first quantizing step with a quantization error in the second quantizing step; and a coding step of coding the output of the first quantizing step or the output of the second quantizing step selected in the selection control step.

In the aforementioned coding method, the selection control step may perform control such that the output of the first quantizing step is selected when the quantization error in the second quantizing step is greater than the quantization error in the first quantizing step by a predetermined factor of the quantization error of the first quantizing step.

Thus, in the above-described coding method, the quantization error occurring when the output coefficient calculated by using the correlation coefficient of a plurality of channel signals determined for the previous zone is used as the output coefficient for the current zone is compared with the quantization error occurring when the output coefficient calculated by using the correlation coefficient of the plurality of channel signals determined for the current zone is used. According to the comparison result, the quantized output is selected. With this configuration, the boundary noise at the frame boundary areas can be reduced.

According to a yet further aspect of the present invention, there is provided a coding method for mixing a plurality of channel signals every predetermined regular zone and for coding a resulting mixed output signal. The coding method includes: a determining step of determining whether it is allowed to change an output coefficient based on regularity of the plurality of channel signals; a processing step of setting the output coefficient determined in the determining step as an output coefficient of the mixed output signal; a quantizing step of quantizing a spectrum signal obtained by performing spectrum transform on the mixed output signal supplied from the processing step; and a coding step of coding the signal quantized in the quantizing step.

In the aforementioned coding method, the determining step may determine that it is not allowed to change the output coefficient when the plurality of channel signals have the regularity, and the determining step may determine that it is allowed to change the output coefficient when the plurality of channel signals do not have the regularity.

In the aforementioned coding method, when it is determined by the determining step that it is not allowed to change the output coefficient, the processing step may set an output coefficient calculated by using a correlation coefficient of the plurality of channel signals, which is determined for a previous zone, as an output coefficient of the mixed output signal for a current zone. When it is determined by the determining step that it is allowed to change the output coefficient, the processing step may set an output coefficient calculated by using the correlation coefficient of the plurality of channel signals, which is determined for the current zone, as the output coefficient of the mixed output signal for the current zone.

The regularity of the plurality of channel signals may be the regularity of zone lengths, each zone length being between one peak to a subsequent peak in the plurality of channel signals. Alternatively, the regularity of the plurality of signals may be the regularity of zone lengths, each zone length being between one zero-crossing position to a subsequent zero-crossing position in which each of the plurality of channel signals intersects with a zero level.

Thus, in the above-described coding method, when a plurality of channel signals have the regularity, the output coefficient calculated by using the correlation coefficient of the channel signals determined for the previous zone is used as the output coefficient for the current zone. When the plurality of channel signals do not have the regularity, the output coefficient calculated by using the correlation coefficient of the plurality of channel signals determined for the current zone is used. With this configuration, the boundary noise at the frame boundary areas can be reduced with a small amount of computation.

According to a further aspect of the present invention, there is provided a coding method for mixing a plurality of channel signals every predetermined regular zone and for coding a resulting mixed output signal. The coding method includes: a correlation-coefficient determining step of determining a new correlation coefficient by averaging a correlation coefficient of the plurality of channel signals for a current zone and at least one of a correlation coefficient of the plurality of channel signals for a past zone and a correlation coefficient of the plurality of channel signals for a future zone; a processing step of setting an output coefficient determined from the new correlation coefficient as an output coefficient of the mixed output signal; a quantizing step of quantizing a spectrum signal obtained by performing spectrum transform on the mixed output signal supplied from the processing step; and a coding step of coding the signal quantized in the quantizing step.

In the aforementioned coding method, a new correlation coefficient is determined by averaging a correlation coefficient for the current zone and a correlation coefficient for a past zone and/or a correlation coefficient for a future zone. Then, the output coefficient calculated by using the new correlation coefficient is set as the output coefficient of the mixed output signal. The mixed output signal is then quantized and coded. With this configuration, variation in the output coefficient can be suppressed, thereby reducing the boundary noise at the frame boundary areas.

According to a further aspect of the present invention, there is provided a recording medium in which a coded signal string is recorded, the coded signal string being coded and generated according to a coding method for mixing a plurality of channel signals every predetermined regular zone and for coding a resulting mixed output signal. The coding method includes: a first processing step of setting an output coefficient calculated by using a correlation coefficient of the plurality of channel signals, which is determined for a previous zone, as an output coefficient of the mixed output signal for a current zone; a second processing step of setting an output coefficient calculated by using a correlation coefficient of the plurality of channel signals, which is determined for the current zone, as the output coefficient of the mixed output signal for the current zone; a first quantizing step of quantizing a spectrum signal obtained by performing spectrum transform on the mixed output signal supplied from the first processing step; a second quantizing step of quantizing a spectrum signal obtained by performing spectrum transform on the mixed output signal supplied from the second processing step; a selection control step of controlling the selection of an output of the first quantizing step and an output of the second quantizing step based on a result of comparing a quantization error in the first quantizing step with a quantization error in the second quantizing step; and a coding step of coding the output of the first quantizing step or the output of the second quantizing step selected in the selection control step.

In the aforementioned recording medium, the selection control step may perform control such that the output of the first quantizing step is selected when the quantization error in the second quantizing step is greater than the quantization error in the first quantizing step by a predetermined factor of the quantization error of the first quantizing step.

Thus, in the above-described recording medium, the quantization error occurring when the output coefficient calculated by using the correlation coefficient of a plurality of channel signals determined for the previous zone is used as the output coefficient for the current zone is compared with the quantization error occurring when the output coefficient calculated by using the correlation coefficient of the plurality of channel signals determined for the current zone is used. According to the comparison result, the quantized output is selected, and the coded signal is recorded. With this configuration, a code string having less boundary noise at the frame boundary areas can be recorded.

According to a further aspect of the present invention, there is provided recording medium in which a coded signal string is recorded, the coded signal string being coded and generated according to a coding method for mixing a plurality of channel signals every predetermined regular zone and for coding a resulting mixed output signal. The coding method includes: a determining step of determining whether it is allowed to change an output coefficient based on regularity of the plurality of channel signals; a processing step of setting the output coefficient determined in the determining step as an output coefficient of the mixed output signal; a quantizing step of quantizing a spectrum signal obtained by performing spectrum transform on the mixed output signal supplied from the processing step; and a coding step of coding the signal quantized in the quantizing step.

In the aforementioned recording medium, the determining step may determine that it is not allowed to change the output coefficient when the plurality of channel signals have the regularity, and the determining step may determine that it is allowed to change the output coefficient when the plurality of channel signals do not have the regularity.

In the aforementioned recording medium, when it is determined by the determining step that it is not allowed to change the output coefficient, the processing step may set an output coefficient calculated by using a correlation coefficient of the plurality of channel signals, which is determined for a previous zone, as an output coefficient of the mixed output signal for a current zone. When it is determined by the determining step that it is allowed to change the output coefficient, the processing step may set an output coefficient calculated by using the correlation coefficient of the plurality of channel signals, which is determined for the current zone, as the output coefficient of the mixed output signal for the current zone.

The regularity of the plurality of channel signals may be the regularity of zone lengths, each zone length being between one peak to a subsequent peak in the plurality of channel signals. Alternatively, the regularity of the plurality of signals may be the regularity of zone lengths, each zone length being between one zero-crossing position to a subsequent zero-crossing position in which each of the plurality of channel signals intersects with a zero level.

Thus, in the above-described recording medium, when a plurality of channel signals have the regularity, the output coefficient calculated by using the correlation coefficient of the channel signals determined for the previous zone is used as the output coefficient for the current zone. When the plurality of channel signals do not have the regularity, the output coefficient calculated by using the correlation coefficient of the plurality of channel signals determined for the current zone is used. The mixed output signal is then quantized and coded, and the coded string is recorded. With this configuration, a code string coded by the coding method in which the boundary noise at the frame boundary areas can be reduced with a small amount of computation can be recorded.

According to a further aspect of the present invention, there is provided a recording medium in which a coded signal string is recorded, the coded signal string being coded and generated according to a coding method for mixing a plurality of channel signals every predetermined regular zone and for coding a resulting mixed output signal. The coding method includes: a correlation-coefficient determining step of determining a new correlation coefficient by averaging a correlation coefficient of the plurality of channel signals for a current zone and at least one of a correlation coefficient of the plurality of channel signals for a past zone and a correlation coefficient of the plurality of channel signals for a future zone; a processing step of setting an output coefficient determined from the new correlation coefficient as an output coefficient of the mixed output signal; a quantizing step of quantizing a spectrum signal obtained by performing spectrum transform on the mixed output signal supplied from the processing step; and a coding step of coding the signal quantized in the quantizing step.

In the aforementioned recording medium, a new correlation coefficient is determined by averaging a correlation coefficient for the current zone and a correlation coefficient for a past zone and/or a correlation coefficient for a future zone. Then, the output coefficient calculated by using the new correlation coefficient is set as the output coefficient of the mixed output signal. The mixed output signal is then quantized and coded. The coded string is then recorded. With this configuration, variation in the output coefficient can be suppressed, and a code string coded by the coding method in which the boundary noise at the frame boundary areas can be reduced is recorded.

BRIEF DESCRIPTION OF THE DRAWINGS

FIGS. 10A and 10B illustrate the occurrence of discontinuous areas at the frame boundary portions caused by the multiplication of the channel mixture ratio: FIG. 10A illustrates a signal waveform before the channel mixture ratio is multiplied; and FIG. 10B illustrates a signal waveform after the channel mixture ratio is multiplied;

FIGS. 12A and 12B illustrate a signal which is not faithfully reproduced in the channel separation circuit shown in FIG. 11: FIG. 12A illustrates a signal waveform before being reproduced; and FIG. 12B illustrates a signal waveform having distortions at the connecting portions after being reproduced;

FIG. 14A illustrates a signal having a flat spectrum distribution; and FIG. 14B illustrates a signal having high tone characteristics;

DESCRIPTION OF THE PREFERRED EMBODIMENTS

The present invention is described in detail below with reference to the accompanying drawings through illustration of a preferred embodiment.

Before discussing the present embodiment, the coding device disclosed in document 1 is discussed below.

Figure 1:
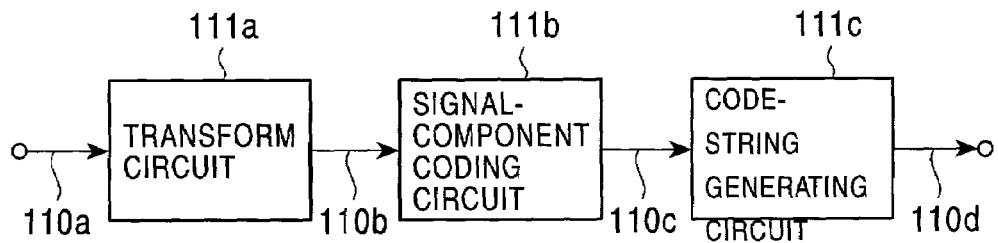
FIG. 1 is a block diagram illustrating an example of the circuit configuration of a known coding device.

In the coding device of document 1, as shown in FIG. 1, an input signal waveform $110a$ is transformed into signal frequency components $110b$ by a transform circuit $111a$, and each signal frequency component $110b$ is coded by a signal-component coding circuit $111b$, resulting in a coded signal $110c$. Then, a code-string generating circuit $110c$ generates a code string $110d$ from the coded signal $110c$.

Figure 2:
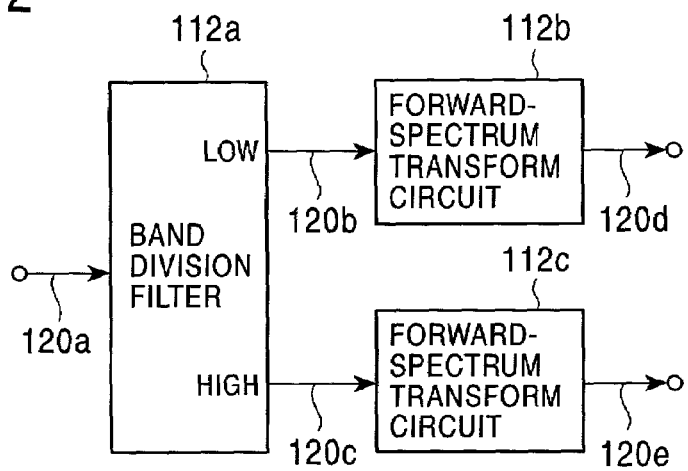
FIG. 2 is a block diagram illustrating the configuration of a transform circuit of the coding device shown in FIG. 1.

Details of the transform circuit $111a$ are shown in FIG. 2. An input signal $120a$ is divided into two bands by a band division filter 112a, and resulting two band signals 120b and 120c are respectively transformed into spectrum signal components 120d and 120e by forward-spectrum transform circuits 112b and 112c using, for example, the modified discrete cosine transform (MDCT). The input signal 120a corresponds to the signal waveform 110a in FIG. 1, and the spectrum signal components 120d and 120e correspond to the signal frequency component 110b in FIG. 1. In the transform circuit 111a shown in FIG. 2, the bandwidth of each of the two band signals 120b and 120c is one half the bandwidth of the input signal 120a, namely, the input signal 120a is decimated by two. The transform circuit 111a is not restricted to the above-described configuration, and may be formed in another configuration. For example, the input signal may be directly transformed into spectrum signals by using MDCT, the discrete Fourier transform (DFT), or the discrete cosine transform (DCT).

Although a detailed explanation is not given, in the coding device shown in FIG. 1, the standards are extended so that signals of more channels can be played back while signals of less channels can still be played back in an old-standard playback apparatus. In playing back a stereo signal, quantization noise caused by coding the stereo signal sometimes becomes problematic depending on the type of stereo signal.

Figure 3:
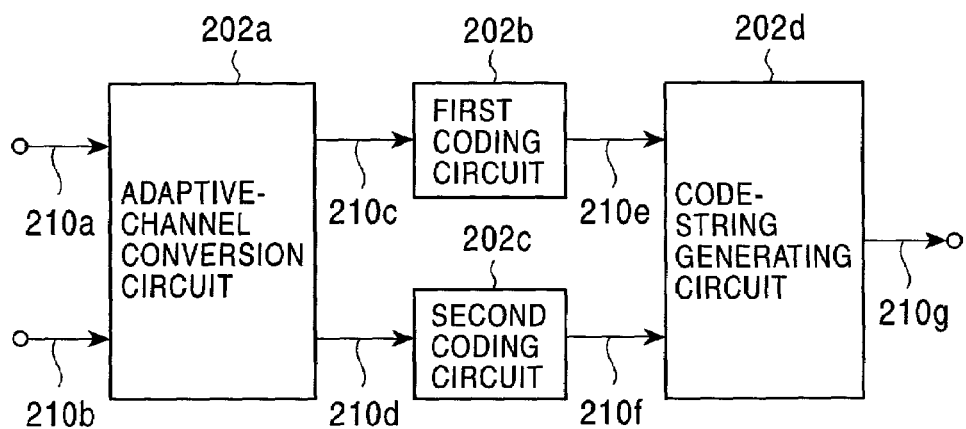
FIG. 3 is a block diagram illustrating another example of the circuit configuration of a known coding device.

Accordingly, document 1 discloses a coding device shown in FIG. 3. In the coding device shown in FIG. 3, an L-channel input signal 210a corresponding to a left speaker and an R-channel input signal 210b corresponding to a right speaker undergo adaptive channel conversion, which is discussed in detail below, by an adaptive-channel conversion circuit 202a so as to be converted into an A signal 210c and a B signal 210d, respectively, which are mixed output signals. The A signal 210c and the B signal 210d are supplied to a first coding circuit 202b and a second coding circuit 202c, respectively. The first and second coding circuits 202b and 202c are configured similarly to the signal-component coding circuit 111b shown in FIG. 1. A coded signal 210e is generated by the first coding circuit 202b and a coded signal 210f is generated by the second coding circuit 202c, and the coded signals 210e and 210f are both supplied to a code-string generating circuit 202d. A code string 210g is then generated by the code-string generating circuit 202d and is output.

Figure 4:
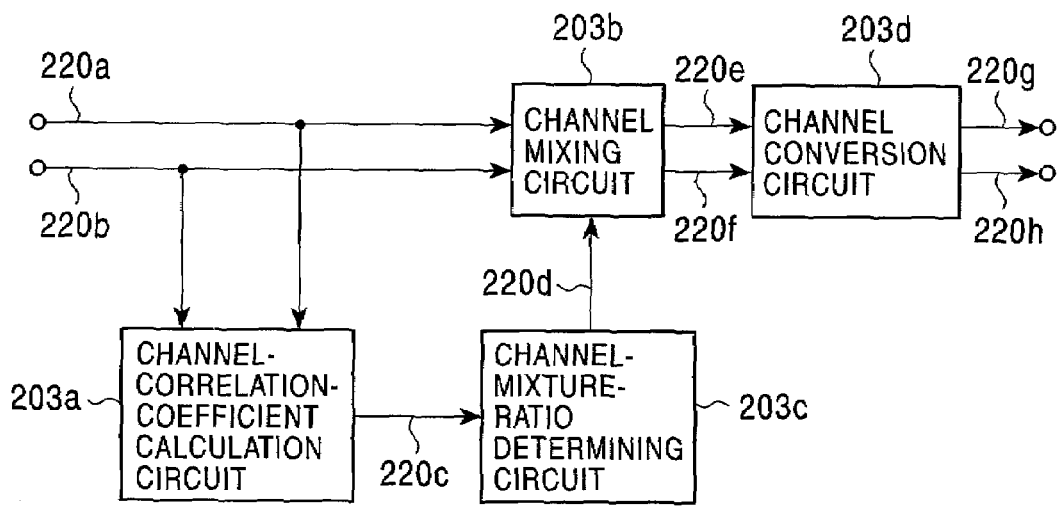
FIG. 4 illustrates the configuration of an adaptive-channel conversion circuit of the coding device shown in FIG. 3.

The specific configuration of the adaptive-channel conversion circuit 202a shown in FIG. 3 is shown in FIG. 4. Input signals 220a and 220b corresponding to the L-channel input signal 210a and the R-channel input signal 210b, respectively, shown in FIG. 3 are supplied to a channel-correlation-coefficient calculation circuit 203a and a channel mixing circuit 203b. In the channel-correlation-coefficient calculation circuit 203a, the channel correlation coefficient R_c of the input signals 220a and 220b is calculated by the following equation (4):

$$R\_c = S\_lr / (S\_l * S\_r) \quad (4)$$

where S_l and S_r indicate the standard deviations of the L and R channels, respectively, and S_lr represents the covariance of the L and R channels. The channel correlation coefficient ranges from −1.0 to 1.0. When the increases/decreases of both the channels are equal to each other, the channel correlation coefficient R_c is 1.0, and conversely, when the increases/decreases are totally opposite, R_c is −1.0. When the increases/decreases of the two channels do not have any correlation, R_c is close to 0. That is, when L and R channels are monaural signals, R_c is 1.0, and when L and R channels are stereo signals which are 180° out of phase with each other, R_c is −1.0. For typical stereo signals on the L and R channels, R_c is 0.5 or greater in most cases.

The channel correlation coefficient R_c obtained in the channel-correlation-coefficient calculation unit 203a is supplied to a channel-mixture-ratio determining circuit 203c as a signal 220c.

In the channel-mixture-ratio determining circuit 203c, the channel mixture ratio R_m is determined from the channel correlation coefficient R_c.

Figure 5:
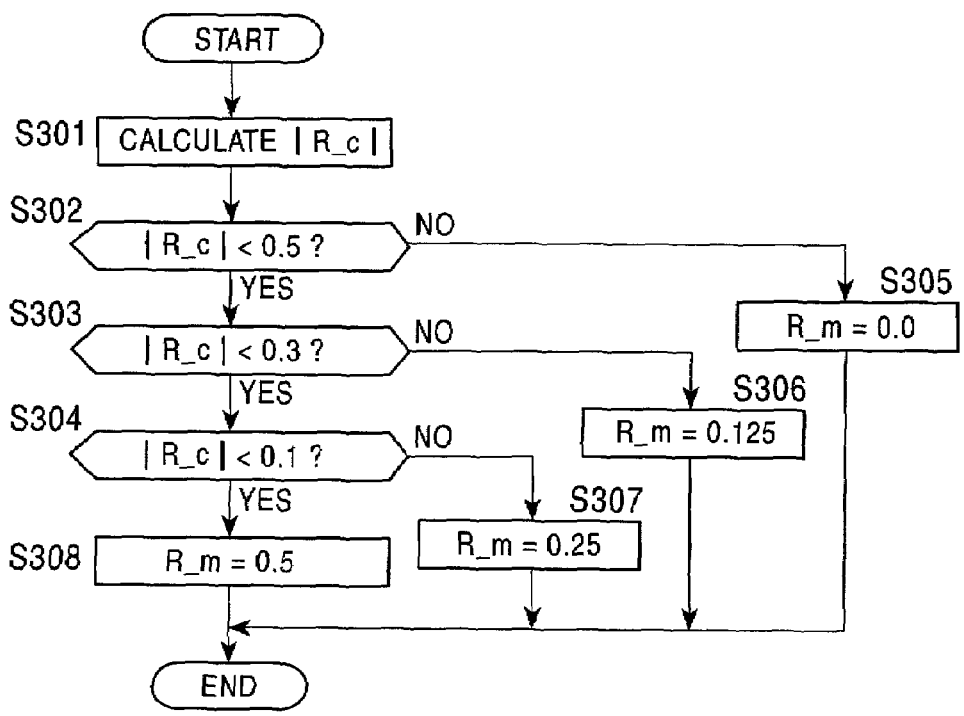
FIG. 5 is a flowchart illustrating the processing performed in a channel-mixture-ratio determining circuit of the coding device shown in FIG. 3.

FIG. 5 is a flowchart illustrating an example of a specific process for determining the channel mixture ratio R_m in the channel-mixture-ratio determining circuit 203c.

In FIG. 5, in step S301, the absolute value |R_c| of the channel correlation coefficient R_c supplied from the channel-correlation-coefficient calculation circuit 203a is determined. Then, it is determined in step S302 whether |R_c| is less than 0.5, and if it is less than 0.5, the process proceeds to step S303. If it is not less than 0.5, the process proceeds to step S305 in which the channel mixture ratio R_m is set to 0.0.

A determination is further made in step S303 whether |R_c| is less than 0.3, and if it is less than 0.3, the process proceeds to step S304. If it is not less than 0.3, the process proceeds to step S306 in which the channel mixture ratio R_m is set to 0.125.

A determination is further made in step S304 whether |R_c| is less than 0.1. If it is less than 0.1, the process proceeds to step S308 in which the channel mixture ratio R_m is set to 0.5. If |R_c| is not less than 0.1, the process proceeds to step S307 in which the channel mixture ratio R_m is set to 0.25.

In this example, the channel mixture ratio R_m is set to be greater as the absolute value |R_c| of the channel correlation coefficient becomes smaller. Although in this example the channel mixture ratio R_m ranges from 0.0 to 0.5, it may be set to an optimal value according to the system to be used.

Returning to FIG. 4, the channel mixture ratio R_m determined in the channel-mixture-ratio determining circuit 203c is sent to the channel mixing circuit 203b as a signal 220d. In this channel mixing circuit 203b, the input signals 220a and 220b are mixed based on the determined channel mixture ratio R_m, and resulting L and R channels 220e and 220f are output to a channel conversion circuit 203d.

In the channel conversion circuit 203d, the following channel conversion processing is performed. The channel conversion circuit 203d converts an L'-channel signal 220e and an R'-channel signal 220f, which are supplied from the channel mixing circuit 203b, into an (L'+R')/2 signal 220g and an (L'−R')/2 signal 220h, respectively. The (L'+R')/2 signal 220g and the (L'−R')/2 signal 220h are supplied to the first coding circuit 202b and the second coding circuit 202c, respectively, shown in FIG. 3.

Although in FIG. 4 the channel mixing processing and the channel conversion processing are separately performed in the channel mixing circuit 203b and the channel conversion circuit 203d, respectively, they may be performed simultaneously. That is, the channel mixing circuit 203b and the channel conversion circuit 203d may be integrated into a channel mixing/conversion circuit.

Figures 6, 7:
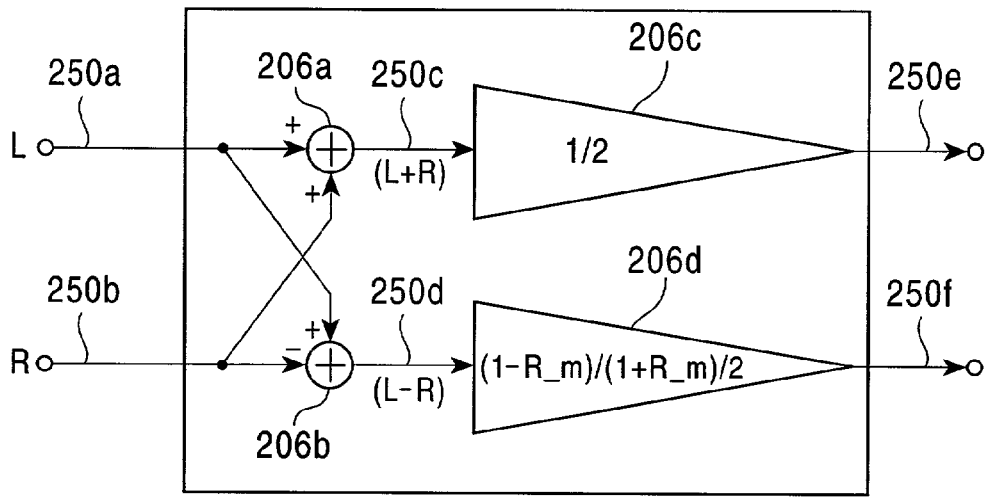
FIG. 6 illustrates the configuration of a channel mixing/conversion circuit formed by a combination of a channel mixing circuit and a channel conversion circuit of the coding device shown in FIG. 3.
FIG. 7 illustrates a change in the channel mixture ratio according to the frame in a known coding device.

The specific configuration of such a channel mixing/conversion circuit is shown in FIG. 6. In FIG. 6, signals 250a and 250b correspond to the L-channel input signal 220a and the R-channel input signal 220b, respectively, in FIG. 4.

The L-channel signal 250a and the R-channel signal 250b are input into an adder 206a and are added therein. An output signal 250c of the adder 206a is input into a multiplier 206c where it is multiplied by ½, which is an output coefficient, and is output as a signal 250e.

Meanwhile, the L-channel signal 250a and the R-channel signal 250b are input into a subtractor 206b where the R-channel input signal 250b is subtracted from the L-channel input signal 250a. An output signal 250d of the subtractor 206b is input into a multiplier 206d where it is multiplied by (1−R_m)/(1+R_m)/2, which is an output coefficient, and is output as a signal 250f.

The output signals 250e and 250f converted from the L and R-channel input signals 250a and 250b and output from the channel mixing/conversion circuit shown in FIG. 6 are set to channel A and channel B. Then, in the channel mixing/conversion circuit shown in FIG. 6, the following equations (5) and (6) are calculated.

$$A=(L+R)/2 \tag{5}$$

$$B=(L-R)(1-R\_m)(1+R\_m)/2 \tag{6}$$

In document 1, the channel-A signal and the channel-B signal generated as described above are coded, thereby reducing the influence of quantization errors caused by coding and decoding the signal on the audio quality.

In the adaptive-channel conversion circuit 202a in document 1, only the correlation of the L and R channels is considered. In order to achieve higher efficiency, however, in addition to the correlation, a change in the temporal characteristics of the input signals, e.g., the regularity and the variability of the characteristics of a signal of each frame, must be checked. Details are given below.

Figure 8:
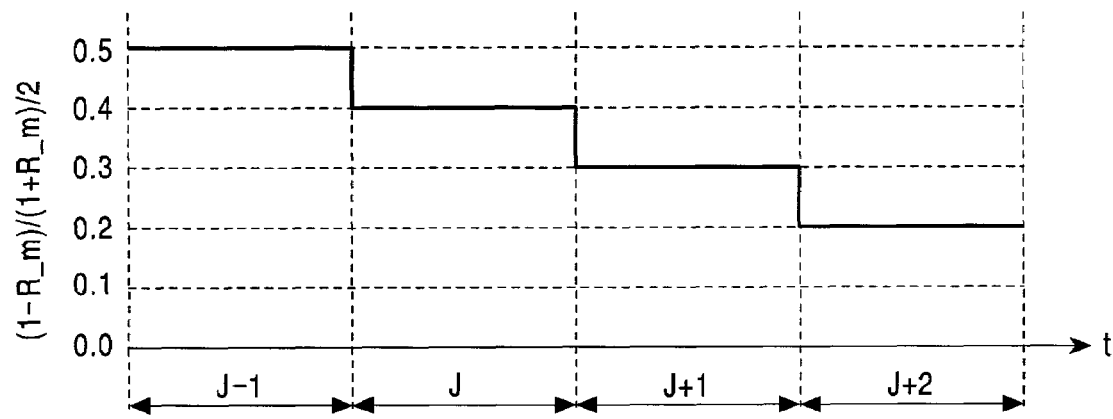
FIG. 8 illustrates the occurrence of discontinuous portions in frame boundary areas in a known coding device.

FIGS. 7 and 8 illustrate the value (1−R_m(j))(1+R_m(j))/2 of the j-th frame when j ranges from J−1 to J+2. Since R_m(j) is determined for each frame, it may differ from frame to frame, as shown in FIGS. 7 and 8. If the quantization precision is infinite, the signal can be faithfully reproduced by performing a decoding operation completely opposite to the coding operation, at the decoding side, even if R_m(j) differs from frame to frame. In practice, however, since the quantization precision is finite, noise occurs unless a certain interpolation operation at the coding side is performed in the frame boundary areas.

Figure 9:
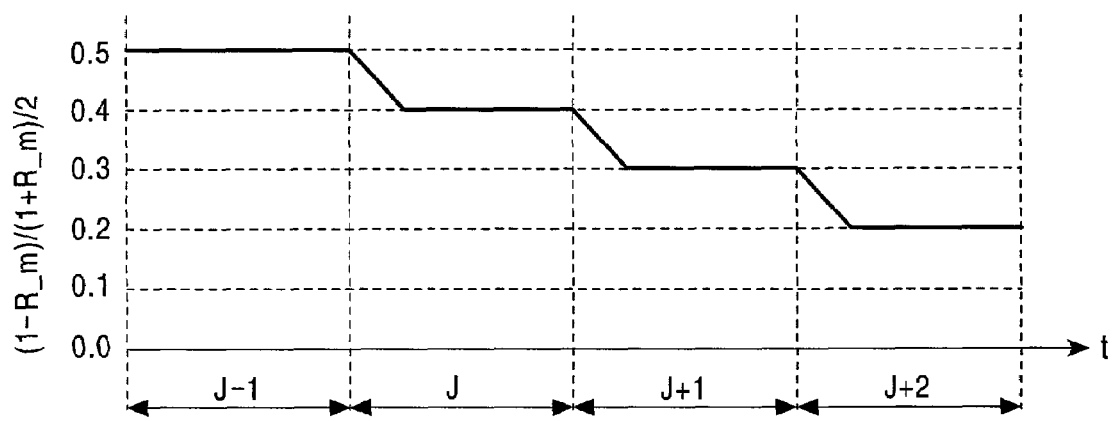
FIG. 9 illustrates the discontinuous portions shown in FIG. 8 interpolated with straights line having an N-order gradient.

Accordingly, in the frame boundary areas, the interpolation operation is effectively performed by using a curve or a straight line having an N-order gradient, such as that shown in FIG. 9. By performing this interpolation operation, the boundary noise can be effectively reduced.

On the decoding side, when performing a decoding operation which is completely opposite to the above-described coding operation, the input signal can be faithfully reproduced if the quantization precision is infinite. However, this technique is used when a high compression ratio must be achieved, and it is impossible to obtain a quantization precision that is high enough to faithfully reproduce the input signal. Accordingly, the boundary noise occurs even if the interpolation operation is performed by using a curve or a straight line having an N-order gradient.

This boundary noise is negligible if it is reduced to a level lower than the noise level generated in performing general spectrum quantizing. However, it becomes problematic on the following occasions. For the sake of simplicity of description, it is now assumed that the boundary noise occurs when the value (1−R_m(j))(1+R_m(j))/2 is changed as shown in FIG. 8.

FIG. 10A schematically illustrates the output signal 250d shown in FIG. 6. FIG. 10A shows that the (L−R) signal in FIG. 6, i.e., the signal obtained in the subtractor 206b, does not contain any element causing discontinuous components. The output signal 250d is multiplied by the channel mixture ratio R_m, which differs from frame to frame, by the multiplier 206d, resulting in the signal 250f. FIG. 10B schematically illustrates the signal 250f. Since the output signal 250d is multiplied by the channel mixture ratio R_m, which differs from frame to frame, discontinuous portions are generated in the frame boundary areas, as shown in FIG. 10B.

In the coding side, the signal 250f in a predetermined number of frames, such as {J−1, J} and {J, J+1}, is simultaneously quantized and coded with a finite precision level by using, for example, MDCT. Accordingly, the output signal 250f cannot be faithfully reproduced in the decoding side. The spectrum transform is not limited to MDCT. However, it is assumed that frames undergo spectrum transform by using MDCT.

Figure 11:
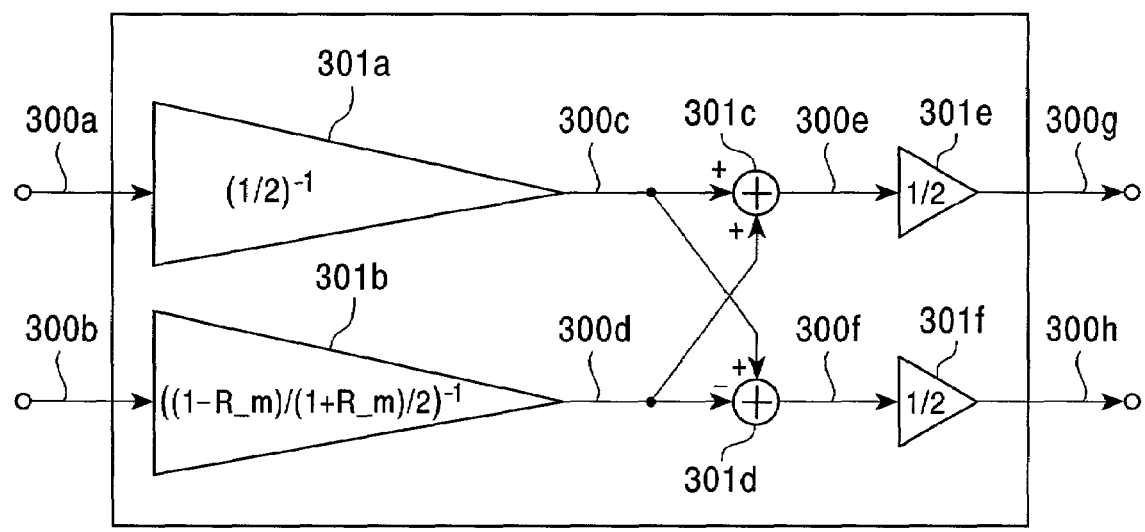
FIG. 11 illustrates the configuration of a channel separation circuit in a known decoding device.

An example of the specific configuration of a channel separation circuit of the decoding side for performing the decoding operation opposite to the coding operation is shown in FIG. 11. For the sake of convenience, the configuration of the channel separation circuit shown in FIG. 11 is represented redundantly. The circuit elements other than the channel separation circuit simply perform operations opposite to the counterparts of the coding side, and an explanation thereof is thus omitted.

In the channel separation circuit, the coded string is decoded to reproduce the MDCT coefficients, and inverse MDCT processing is performed to obtain signals 300a and 300b. The signals 300a and 300b are input into multipliers 301a and 301b, respectively. The signals 300a and 300b respectively correspond to the signals 250e and 250f in the coding side shown in FIG. 6.

In the multiplier 301a, the signal 300a is multiplied by (½)$^{-1}$, and is output as a signal 300c. Meanwhile, in the multiplier 301b, the signal 300b is multiplied by ((1−R_m)/(1+R_m)/2)$^{-1}$, and is output as a signal 300d. The signals 300c and 300d correspond to the output signals 250c and 250d, respectively, in FIG. 6. The signal 250d in FIG. 6 is equal to the signal (L−R), and the signal 300d in FIG. 11 is equal to the signal (L−R)' obtained by quantizing the signal (L−R) and dequantizing it.

The signals 300c and 300d are input into an adder 301c and are added therein. An output signal 300e of the adder 301c is input into a multiplier 301e where it is multiplied by ½ and is output as a signal 300g. Meanwhile, the signals 300c and 300d are input into a subtractor 301d where the difference between the two signals is obtained, resulting in a signal 300f. The output signal 300f is input into a multiplier 301f where it is multiplied by ½ and is output as a signal 300h.

The signal 300b in FIG. 11 is shown in FIG. 12A, and the signal 300d in FIG. 11 is shown in FIG. 12B.

The signal 300b in FIG. 12A perfectly coincides with the signal 250f in FIG. 10B if the quantization precision used in coding and decoding operations is infinite. In practice, however, since the quantization precision is finite, the signal 300b contains quantization errors. Thus, when the signal 300d is reproduced by using the multiplier 301b, distortion occurs in the connecting portions, as shown in FIG. 12B.

Figure 13:
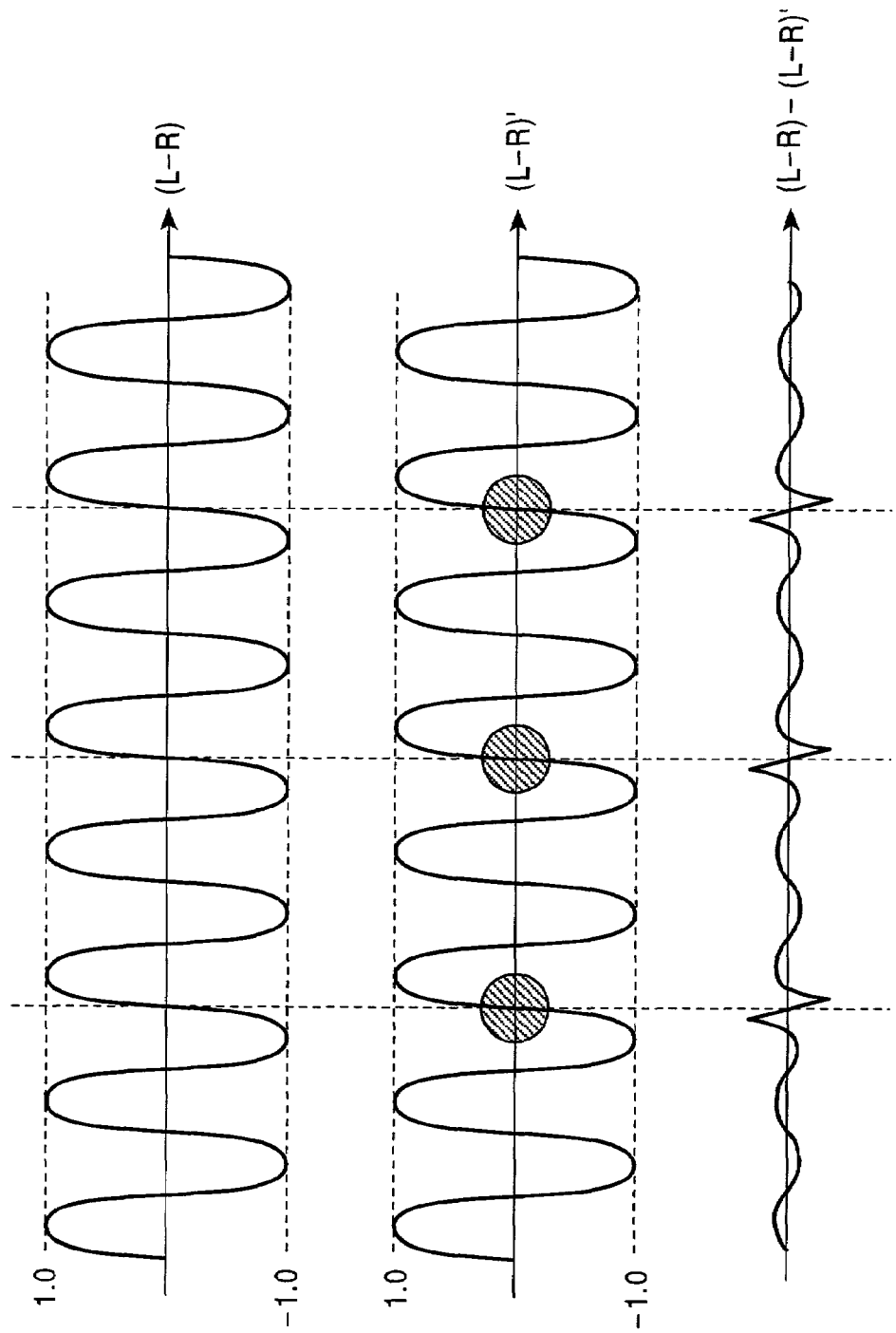
FIG. 13 illustrates the occurrence of errors every frame boundary area after the signal is decoded.

The difference between the signal shown in FIG. 10A and the signal shown in FIG. 12B is schematically shown in FIG. 13. In the decoded signal, as shown in FIG. 13, a high level of error due to discontinuous components occurs in every frame boundary area. These errors occur even if the above-described interpolation operation is performed, as shown in FIG. 9, by using a curve or a straight line having an N-order gradient.

Such errors do not always cause problems in all the frame boundary areas. Under predetermined conditions, however, the noise in the frame boundary areas can be perceived, thereby decreasing the audio quality. This is explained more specifically below.

Figure 14A:
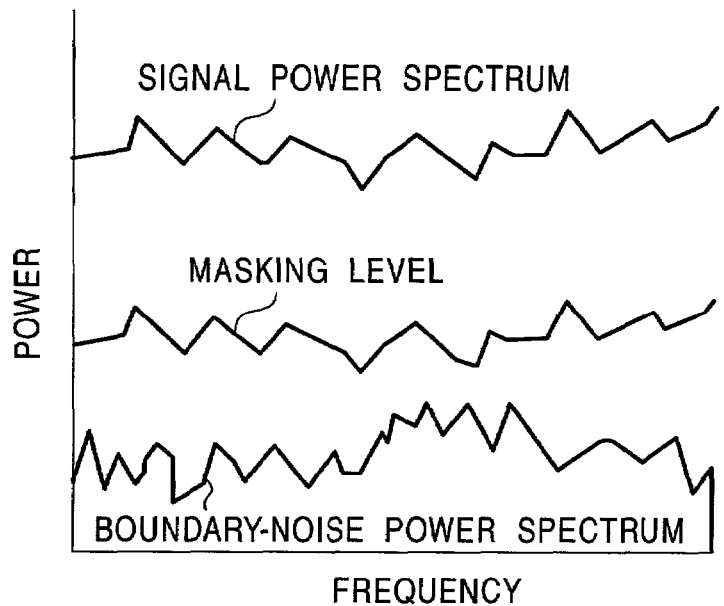
FIGS. 14A and 14B illustrate the occurrence of boundary noise in a signal having high tone characteristics.
Figure 14B:
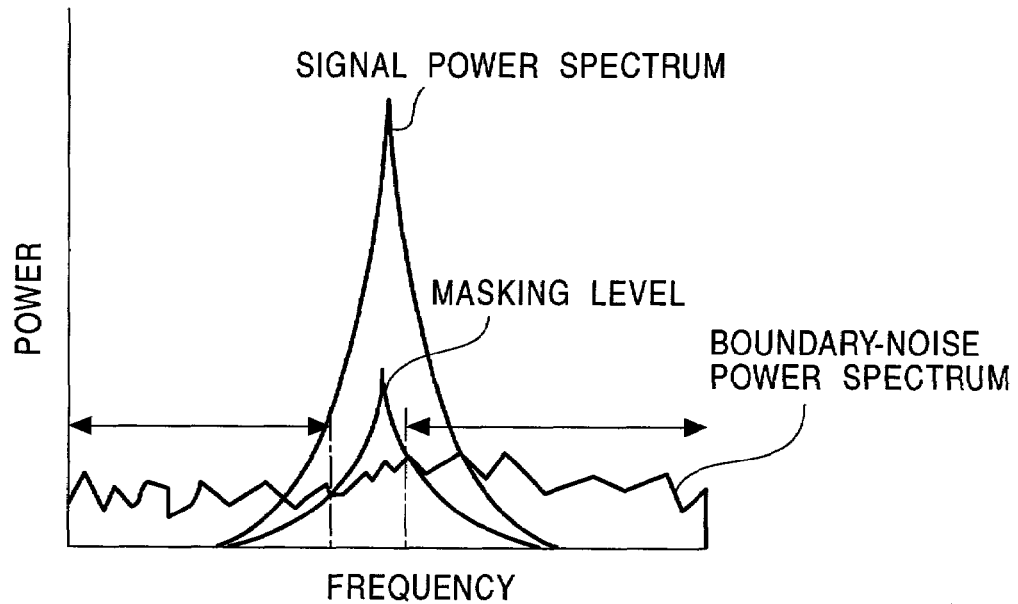

In FIG. 14A, the spectrum distribution is flat, and the energy level of the boundary noise is lower than the spectrum quantization noise level. Accordingly, the boundary noise is masked and is not perceived. As shown in FIG. 14B, however, in a signal having a high tone level, such as a signal having a single frequency, there are certain areas, as indicated by the double-sided arrows in FIG. 14B, in which boundary noise cannot be masked by frequency components, and thus, the boundary noise is perceived, thereby lowering the audio quality. That is, the boundary noise causes a problem when there is no spectrum component which masks the boundary-noise spectrum components.

Accordingly, in the coding device of this embodiment, in order to reduce the above-described boundary noise, the coding side automatically and continuously checks for a signal for masking boundary-noise spectrum components. If there is no signal for masking such components, it is not allowed to change the channel mixture ratio R_m(j).

Figure 15:
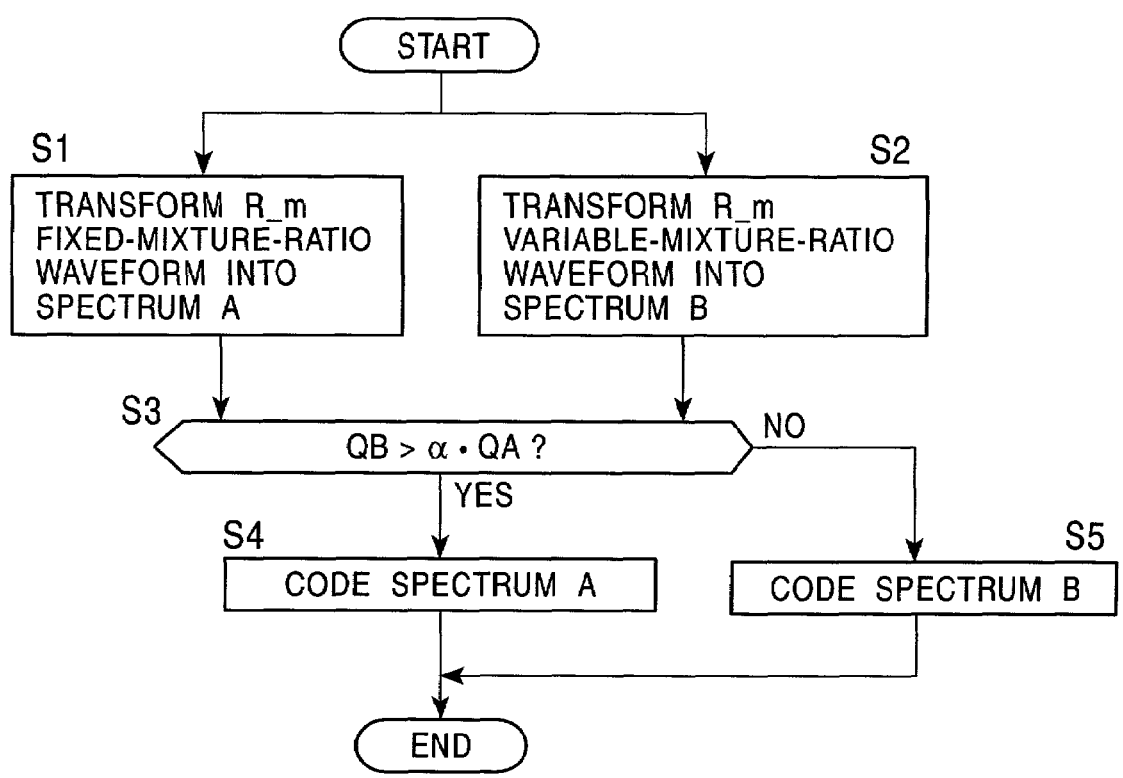
FIG. 15 is a flowchart illustrating a typical example of a noise suppression technique in a coding device of an embodiment of the present invention.

FIG. 15 is a flowchart illustrating a typical example of the noise suppression processing in this embodiment. In step S1, a signal obtained by being mixed with the fixed channel mixture ratio (R_m(J)=R_m(J−1)) is transformed into spectrum A. In step S2, a signal obtained by being mixed with the variable channel mixture ratio R_m(J) is transformed into spectrum B.

Subsequently, after comparing spectrum B with spectrum A, it is determined by using a masking model which spectrum is to be coded. As the masking model, the minimum audible range or other various models may be used, and the simplest technique is to make the above-described determination based on the quantization noise level, which is generated when a spectrum is quantized. In this technique, a quantization error QA occurring when quantizing spectrum A is compared with a quantization error QB occurring when quantizing spectrum B so as to determine by how much the quantization error QB is greater than QA. When the quantization error QB is almost equal to the quantization error QA, the possibility that the boundary noise is perceived is very low. In this manner, without preparing a precise masking model, the boundary noise can be suppressed merely with a simple comparison.

In step S3, the quantization error (level) QA is compared with the quantization error (level) QB. If QB is greater than QA by a factor α, the process proceeds to step S4 in which variation in R_m(j) is prevented. That is, in step S4, the spectrum A is coded, and the process is completed. If it is found in step S3 that QB is not greater than QA by a factor α, the process proceeds to step S5 in which variation in R_m(j) is allowed. That is, in step S5, the spectrum B is coded, and the process is completed. The coefficient α used in step S3 may be determined by a practical audible test. Alternatively, a known precise masking model may be used.

Figure 16:
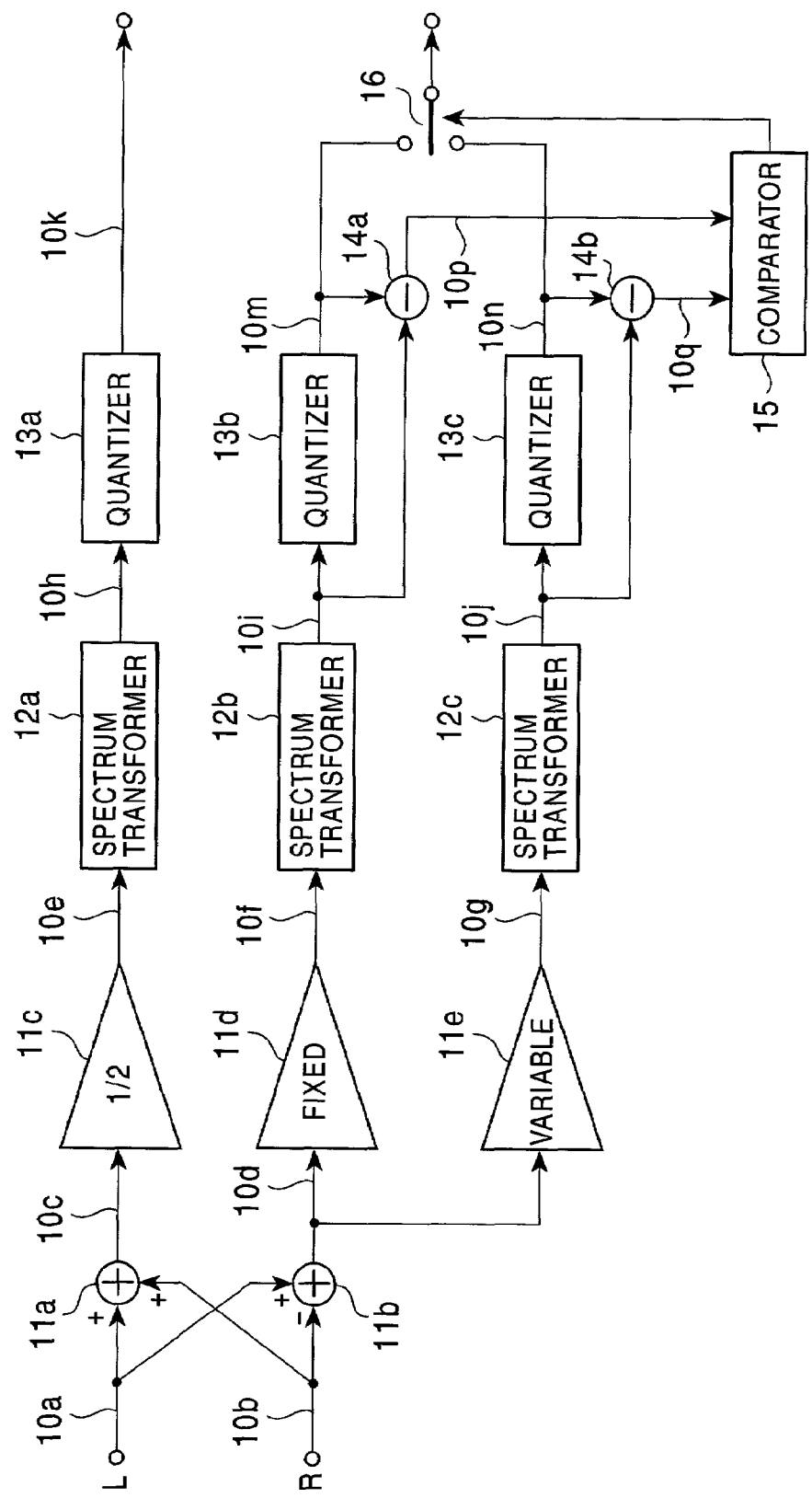
FIG. 16 is a block diagram schematically illustrating part of the configuration of the coding device of the present invention.

The circuit configuration implementing the above-described technique is schematically shown in FIG. 16. FIG. 16 illustrates only the portions required for implementing the processing shown in FIG. 15, and the actual configuration is not restricted to that shown in FIG. 16.

In FIG. 16, an L-channel signal 10a and an R-channel signal 10b in the J-th frame are input into an adder 11a and are added therein. An output signal 10c of the adder 11a is input into a multiplier 11c where it is multiplied by ½, which is an output coefficient, and is output as a signal 10e.

"Meanwhile, the L-channel signal 10a and the R-channel signal 10b in the J-th frame are input into a subtractor 11b in which the difference of the two signals is obtained. An output signal 10d of the subtractor 11b is supplied to multipliers 11d and 11e. In the multiplier 11d, the signal 10d is multiplied by (1−R_m(J−1))/(1+R_m(J−1))/2, which is an output coefficient, and is output as a signal 10f. That is, in the multiplier 11d, R_m(J) is set to R_m(J−1). On the other hand, in the multiplier 11e, the signal 10d is multiplied by (1−R_m(J−1))/(1+R_m(J))/2, which is an output coefficient, and is output as a signal 10g. That is, in the multiplier 11e, R_m(J), which is determined by regular processing, is used."

The mixed output signals 10e, 10f, and 10g are respectively input into spectrum transformers 12a, 12b, and 12c in which they undergo spectrum transform. Resulting output signals 10h, 10i, and 10j are input into quantizers 13a, 13b and 13c, respectively.

In the quantizer 13a, the signal 10h is quantized and is output to a subsequent stage as a signal 10k. In the quantizer 13b, the signal 10i is quantized and is output as a signal 10m. The signals 10i and 10m are input into a subtractor 14a, and a resulting quantization error in the quantizer 13b is supplied to a comparator 15 as a signal 10p. Similarly, in the quantizer 13c, the signal 10j is quantized and is output as a signal 10n. The signals 10j and 10n are input into a subtractor 14b, and a resulting quantization error in the quantizer 13c is supplied to the comparator 15 as a signal 10q.

In the comparator 15, the signal 10q is compared with the signal 10p, as discussed above. That is, it is determined whether the signal 10q is greater than the signal 10p by, for example, a factor α. If so, the comparator 15 controls a switch 16 to select the signal 10m so that variation in R_m(J) is prohibited. If the signal 10q is not greater than the signal 10p by α time, the comparator 15 controls the switch 16 to select the signal 10n so that variation in R_m(J) is allowed. Thus, the signal 10m or the signal 10n is output to the subsequent stage by being selected by the switch 16.

In FIG. 16, the elements before the spectrum transform processing correspond to the channel mixing/conversion circuit shown in FIG. 6, and the elements after the spectrum transform processing correspond to the first stages of the first and second coding circuits 202b and 202c shown in FIG. 3.

In the above-described method, the channel mixing and spectrum transform operation has to be performed a plurality of times in order to set the channel mixture ratio R_m(j), thereby increasing the amount of computation. Accordingly, in the following technique, by checking the regularity of an input signal, it is determined whether boundary noise will be perceived.

More specifically, in this technique, the zone from a peak position of an input signal to the subsequent peak position is checked, and the regularity or the irregularity of the zone lengths is determined. In other words, it is determined how the inter-peak positions are changed in the input signal. When the signal has high tone characteristics, fixed waveforms are regularly disposed in the time signal, in which case, the inter-peak zone lengths become uniform. The peak positions can be easily determined by differentiation. If the inter-peak zone lengths are uniform within a frame, the corresponding signal has high tone characteristics. That is, it can be determined that there are areas in which boundary-noise spectrum components cannot be masked.

Figure 17:
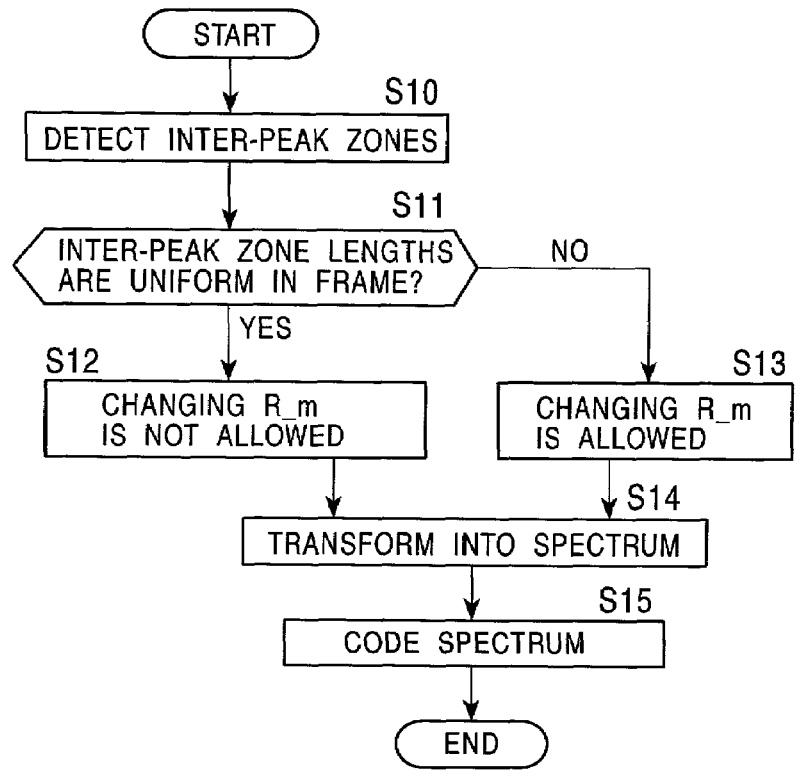
FIG. 17 is a flowchart illustrating another example of the noise suppression technique by checking the regularity of an input signal in the coding device shown in FIG. 16.

FIG. 17 is a flowchart illustrating the above-described technique. In step S10, the inter-peak zones within a frame are detected. The peak positions can be determined by differentiation, as stated above.

It is then determined in step S11 whether the inter-peak zone lengths are uniform within the frame, i.e., whether the input signal has high periodicity. If the outcome of step S11 is yes, the process proceeds to step S12 in which variation in the channel mixture ratio R_m(j) is prevented, and then, the process proceeds to step S14. If it is found in step S11 that the inter-peak zone lengths are not uniform, the process proceeds to step S13 in which variation in the channel mixture ratio R_m(j) is allowed, and then, the process proceeds to step S14.

In step S14, the signal which has undergone the channel mixing/conversion processing based on the channel mixture ratio R_m(j) undergoes spectrum transform. Then, in step S15, the spectrum-transformed signal is coded, and the process is completed.

The regularity of the input signal does not have to be determined based on the inter-peak zones lengths. Alternatively, the regularity of the input signal may be determined by the zero-crossing positions at which the signal simply crosses the zero line. In this case, if the zone lengths between the zero-crossing positions are almost uniform, it may be determined that the input signal has regularity.

As discussed above, by checking the inter-peak zone lengths or the zero-crossing positions, it can be easily determined whether the signal has high tone characteristics. With this technique, the channel mixture ratio R_m(j) which sufficiently prevents boundary noise from being perceived can be determined with a small amount of computation.

Figure 18:
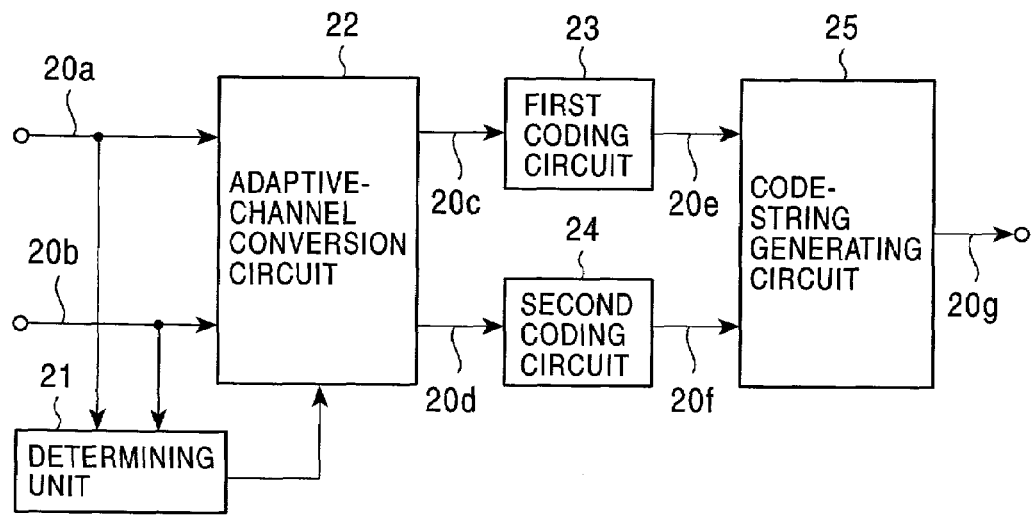
FIG. 18 illustrates the configuration of a coding device provided with a determining unit for determining the regularity of an input signal.

A coding device implementing the above-described technique is shown in FIG. 18. The coding device shown in FIG. 18 is provided with a determining unit 21 for determining whether variation in the channel mixture ratio R_m(j) is allowed by checking the regularity of the input signal. Other techniques can be considered for determining the regularity of the input signal, and the technique is not particularly restricted.

In this case, an L-channel signal 20a and an R-channel signal 20b are input into the determining unit 21, and the determining unit 21 checks the regularity of the L-channel signal 20a and the R-channel signal 20b, as discussed above. If the tone characteristics of the L-channel signal 20a and the R-channel signal 20b are high, the determining unit 21 supplies a control signal indicating that variation in the channel mixture ratio R_m(j) is prohibited to an adaptive-channel conversion circuit 22. If the tone characteristics of the input signals 20a and 20b are not high, the determining unit 21 supplies a control signal indicating that variation in the channel mixture ratio R_m(j) is allowed to the adaptive-channel conversion circuit 22.

The operations of the elements other than the determining unit 21 are similar to the counterparts of the coding device shown in FIG. 3, and an explanation thereof is thus omitted.

In order to further effectively inhibit boundary noise, the processing shown in FIG. 17 can be effectively performed together with the following two types of processing. With this combination, it is possible to effectively decrease the number of frames in which boundary noise occurs.

Figure 19:
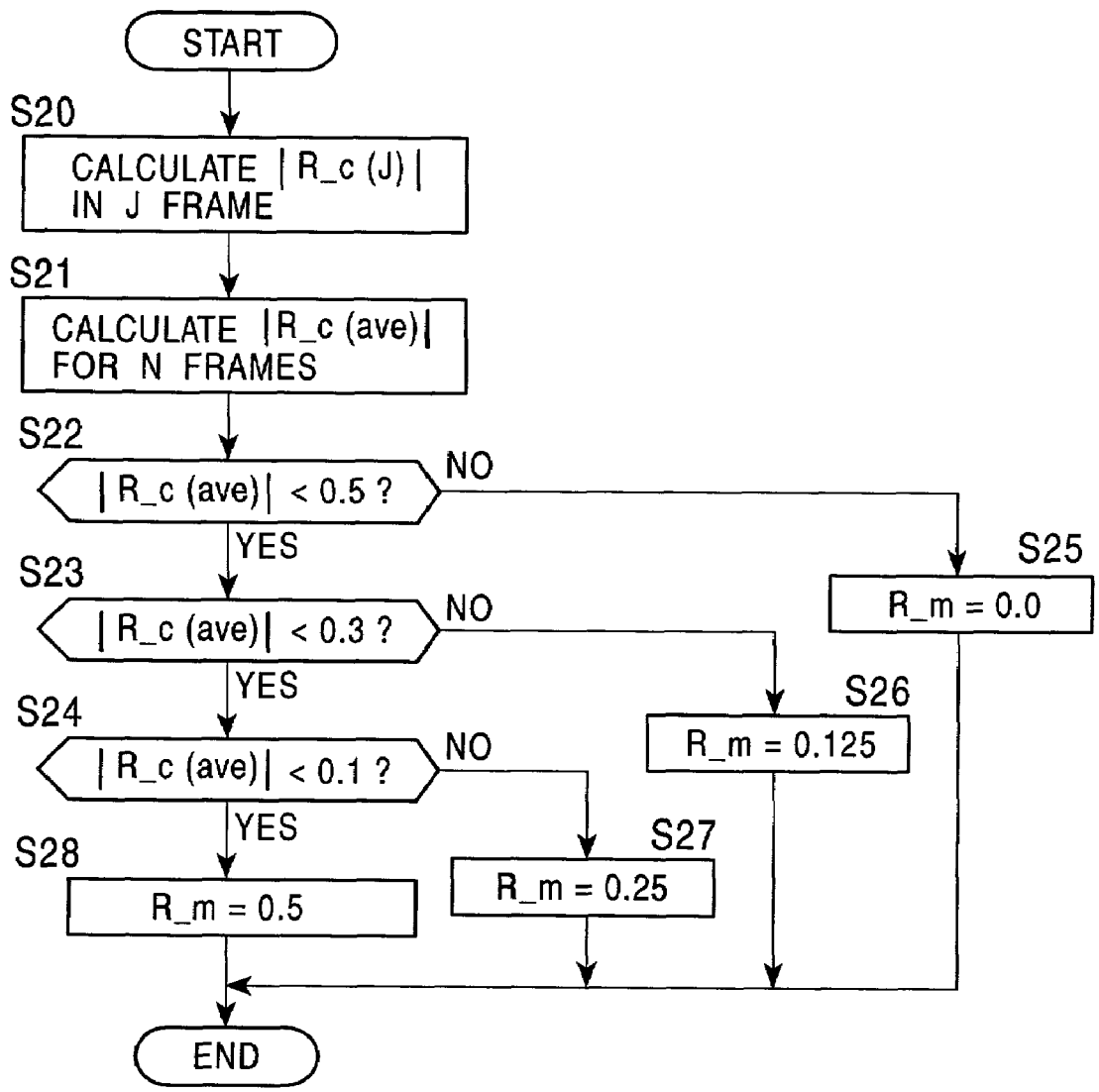
FIG. 19 is a flowchart illustrating a technique for inhibiting a change in the channel mixture ratio by averaging channel correlation coefficients.

As the first type of processing, the averaging processing indicated by the flowchart of FIG. 19 is performed. More specifically, instead of determining the channel mixture ratio R_m(j) for each frame, the channel correlation coefficients R_c(j) of the previous few frames are averaged to determine R_c(ave), and the channel mixture ratio R_m(j) is determined by using the averaged correlation coefficient R_c(ave). Since the correlation coefficients R_c(j) are averaged, the variation in the channel mixture ratio R_m(j) becomes smaller, thereby decreasing the number of frames in which boundary noise is perceived.

In FIG. 19, in step S20, the absolute value |R_c(J)| of the channel correlation coefficient R_c(J) is calculated. Then, in step S21, the channel correlation coefficients |R_c(J)| for N frames are averaged to obtain |R_c(ave)|. Although in step S21 the current frame and the past frames are averaged, the current frame may be averaged with the past and/or future frames.

Subsequently, it is determined in step S22 whether |R_c(ave)| is less than 0.5. If it is less than 0.5, the process proceeds to step S23. If it is not less than 0.5, the process proceeds to step S25 in which R_m is set to 0.0.

A determination is further made in step S23 whether |R_c(ave)| is less than 0.3. If it is less than 0.3, the process proceeds to step S24. If it is not less than 0.3, the process proceeds to step S26 in which R_m is set to 0.125.

A determination is further made in step S24 as to whether |R_c(ave)| is less than 0.1. If it is less than 0.1, the process proceeds to step S28 in which R_m is set to 0.5. If it is not less than 0.1, the process proceeds to step S27 in which R_m is set to 0.25.

Basically, the first type of processing shown in FIG. 19 is similar to that shown in FIG. 5, and is performed in the channel-mixture-ratio determining circuit. In the first type of processing, a plurality of channel correlation coefficients R_c for a plurality of frames are averaged to obtain R_c(ave), and the channel mixture ratio R_m(j) is determined based on R_c(ave), thereby suppressing variations in R_m(j). It is thus possible to effectively reduce the number of frames in which boundary noise occurs.

As the second type of processing, a mixing signal specifically used for determining the channel correlation coefficient R_c and the channel mixture ratio R_m is prepared. That is, as shown in FIG. 20, a pre-mixing circuit 31 is provided at the previous stage of a channel-correlation-coefficient calculation circuit 32 of the adaptive-channel conversion circuit.

Figure 20:
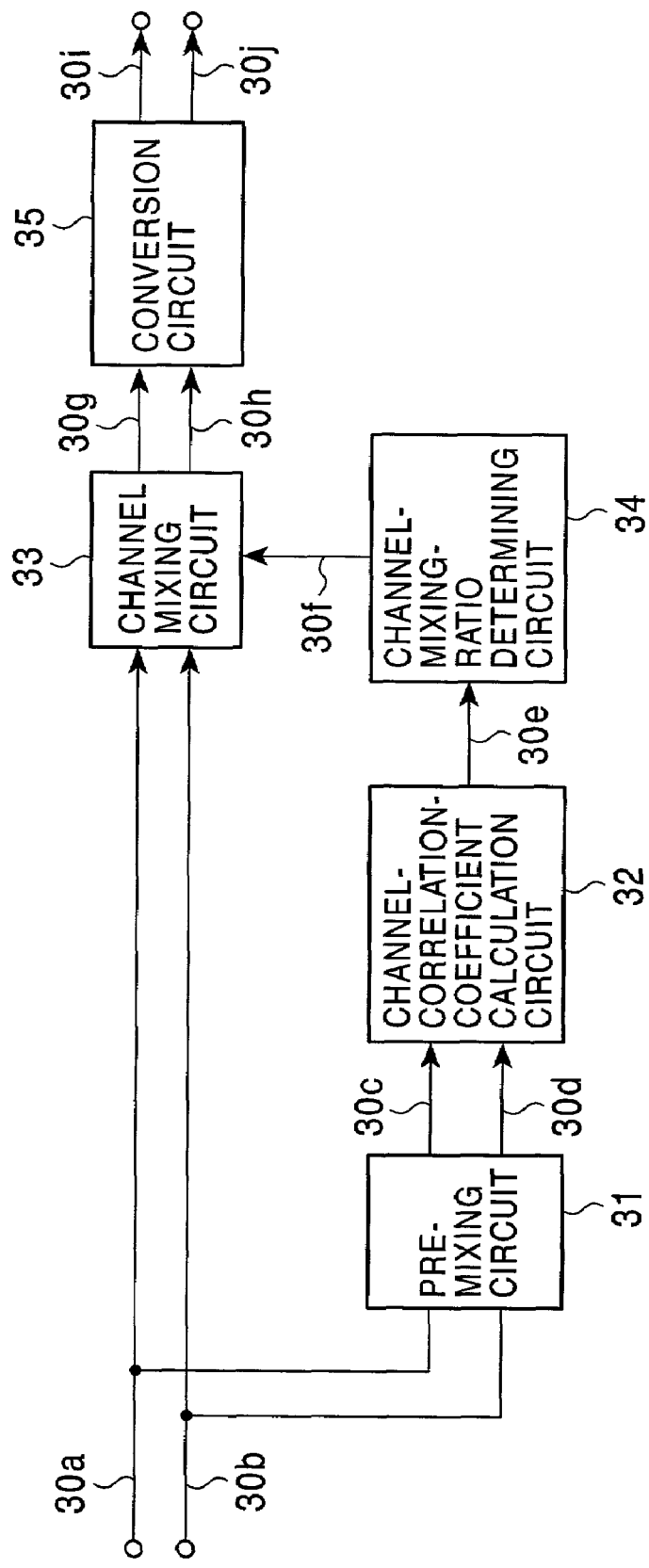
FIG. 20 is a block diagram illustrating part of the configuration of a coding device provided with a pre-mixing circuit for determining the channel correlation coefficient and the channel mixture ratio.

In FIG. 20, an L-channel signal 30a and an R-channel signal 30b are input into the pre-mixing circuit 31 and a channel mixing circuit 33. In the pre-mixing circuit 31, the pre-mixing processing, which is discussed below, is performed on the input signals 30a and 30b, and resulting signals 30c and 30d are supplied to the channel-correlation-coefficient calculation circuit 32.

In the channel-correlation-coefficient calculation circuit 32, the channel correlation coefficient R_c of the signals 30c and 30d is calculated, and is supplied to a channel-mixture-ratio determining circuit 34 as a signal 30e.

In the channel-mixture-ratio determining circuit 34, the channel mixture ratio R_m is determined based on the channel correlation coefficient R_c, and is supplied to the channel mixing circuit 33 as a signal 30f.

In the channel mixing circuit 33, the input signals 30a and 30b are mixed based on the channel mixture ratio R_m, and resulting L and R_channel signals 30g and 30h are output to a channel conversion circuit 35. In the channel conversion circuit 35, the above-described channel conversion processing is performed, thereby outputting signals 30i and 30j.

Figure 21:
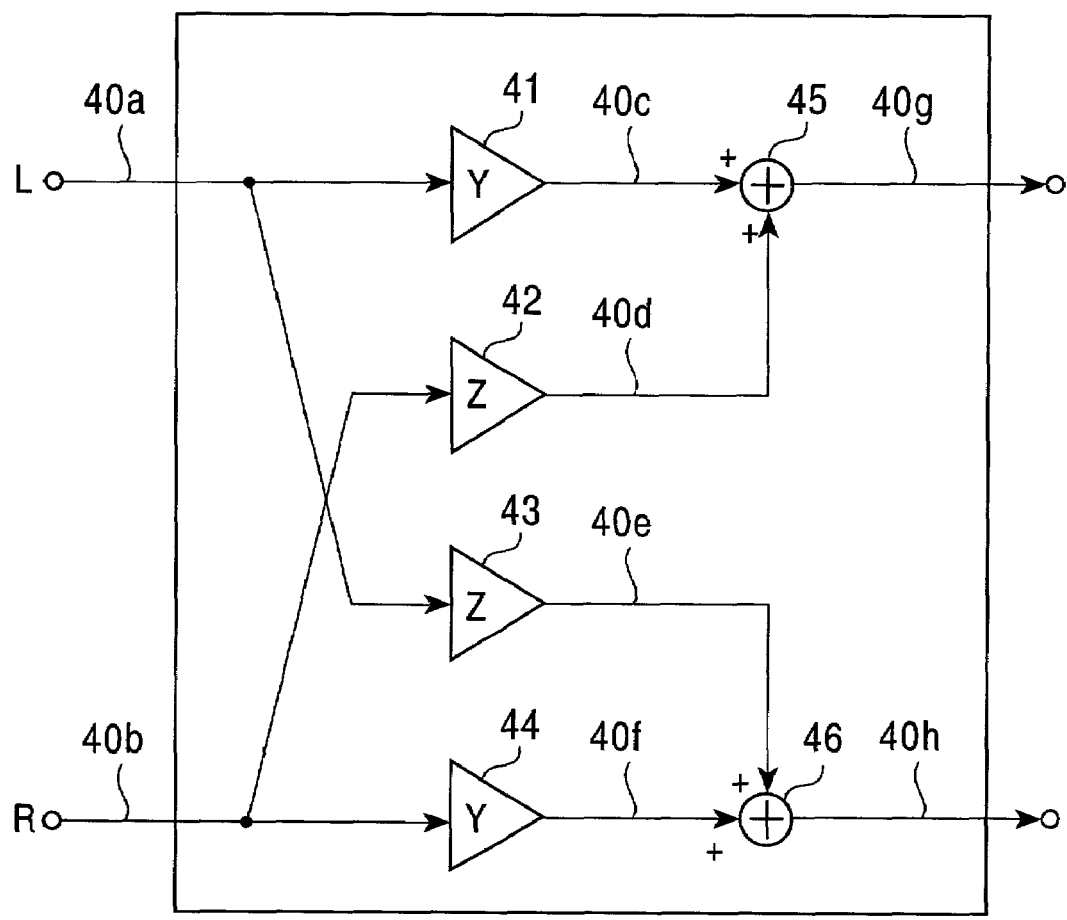
FIG. 21 illustrates the configuration of the pre-mixing circuit shown in FIG. 20.

The specific configuration of the pre-mixing circuit 31 is shown in FIG. 21. In FIG. 21, an L-channel signal 40a and an R-channel signal 40b correspond to the L-channel signal 30a and the R-channel signal 30b, respectively, in FIG. 20.

The L-channel signal 40a is multiplied by Y in a multiplier 41 and is input into an adder 45 as a signal 40c. The L-channel signal 40a is also multiplied by Z in a multiplier 43 and is input into an adder 46 as a signal 40e. Meanwhile, the R-channel signal 40b is multiplied by Z in a multiplier 42 and is input into the adder 45 as a signal 40d. The R-channel signal 40b is also multiplied by Y in a multiplier 44 and is input into the adder 46 as a signal 40f.

In the adder 45, the signals 40c and 40d are added, and a resulting signal is output as a signal 40g corresponding to the signal 30c in FIG. 20. In the adder 46, the signals 40e and 40f are added, and a resulting signal is output as a signal 40h corresponding to the signal 30d in FIG. 20.

As discussed above, in the pre-mixing circuit 31, the L- and R-channel signals are multiplied by predetermined amounts Y and Z, thereby obtaining the signals 40g and 40h. The ratio of Y to Z is set to about 9:1. The channel correlation coefficient R_c(j) and the channel mixture ratio R_m(j) are determined based on the signals 40g and 40h in the channel-correlation-coefficient calculation circuit 32 and the channel-mixture-ratio determining circuit 34, respectively. According to this pre-mixing processing, variations in the channel correlation coefficient R_c(j) and the channel mixture ratio R_m(j) become smaller, thereby decreasing the possibility of switching R_m(j). Thus, the generation of discontinuous components in the frame boundary areas is inhibited when the signals are mixed in the channel mixing circuit 33, resulting in a decrease in boundary noise. Additionally, spectra to be coded are obtained by performing spectrum transform on the input signals 30a and 30b, which are not mixed with each other, thereby preventing a leakage of the signals between the L and R channels.

The codes generated by the above-described coding device are recorded on a recording medium as code strings. Such a recording medium is not restricted to an optical disc, and may be another type of recording media, such as a semiconductor memory, as long as the recording medium can be randomly accessed. Alternatively, such codes may be transmitted via a predetermined transmission medium.

The present invention is not limited to the aforementioned embodiment, and various modifications may be made without departing from the spirit of the gist of the invention.

For example, in the above-described embodiment, the tone characteristics of the input signals are determined by checking the inter-peak zone lengths or the zero-crossing positions. Alternatively, the tone characteristics of the input signals may be determined by checking the energy of each divided band. More specifically, if the energy of a band is higher than that of other bands by a predetermined level, it may be determined that the tone characteristics of the corresponding input signals are high, and variation in the channel mixture ratio R_m is prohibited.

What is claimed is:

1. A coding device for mixing a plurality of channel signals every predetermined regular zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device comprising:

a channel signal mixing unit for mixing the plurality of channel signals based on at least one predetermined channel mixture ratio and outputting at least one mixed output signal;

a first processing unit for setting an output coefficient calculated by using a correlation coefficient of the plurality of channel signals, which is determined for a previous zone, as an output coefficient of the mixed output signal for a current zone;

a second processing unit for setting an output coefficient calculated by using a correlation coefficient of the plurality of channel signals, which is determined for the current zone, as the output coefficient of the mixed output signal for the current zone;

a first quantizing unit for quantizing a spectrum signal obtained by performing spectrum transform on the mixed output signal using the output coefficient supplied from said first processing unit;

a second quantizing unit for quantizing a spectrum signal obtained by performing spectrum transform on the mixed output signal using the output coefficient supplied from said second processing unit;

a selection control unit for controlling the selection of an output of said first quantizing unit and an output of said second quantizing unit based on a result of comparing a quantization error in said first quantizing unit with a quantization error in said second quantizing unit; and a coding unit for coding the output of said first quantizing unit or the output of said second quantizing unit selected by said selection control unit.

2. A coding device according to claim 1, wherein said selection control unit performs control such that the output of said first quantizing unit is selected when the quantization error of said second quantizing unit is greater than the quantization error of said first quantizing unit by a predetermined factor of the quantization error of said first quantizing unit.

3. A coding device according to claim 1, wherein an intermediate signal based on a sum of a left channel signal and a right channel signal and a side signal based on a difference between the left channel signal and the right channel signal are coded, and said first processing unit and said second processing unit multiply the side signal by the output coefficient so as to obtain the mixed output signal.

4. A coding device according to claim 1, wherein the correlation coefficient is determined from standard deviations and covariance of the plurality of channel signals.

5. A coding device according to claim 1, wherein the channel signals are audio signals.

6. A coding device for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device comprising:

a determining unit for determining whether it is allowed to change an output coefficient based on a regularity of zone lengths of the plurality of channel signals;

a channel signal mixing unit for mixing the plurality of channel signals based on at least one predetermined channel mixture ratio and outputting at least one mixed output signal;

a processing unit for setting the output coefficient as an output coefficient of the mixed output signal;

a quantizing unit for quantizing a spectrum signal obtained by performing spectrum transform on the mixed output signal supplied from said processing unit; and a coding unit for coding the signal quantized by said quantizing unit.

7. A coding device according to claim 6, wherein said determining unit determines that it is not allowed to change the output coefficient when the plurality of channel signals have the regularity, and said determining unit determines that it is allowed to change the output coefficient when the plurality of channel signals do not have the regularity.

8. A coding device according to claim 7, wherein, when it is determined by said determining unit that it is not allowed to change the output coefficient, said processing unit sets an output coefficient calculated by using a correlation coefficient of the plurality of channel signals, which is determined for a previous zone, as an output coefficient of the mixed output signal for a current zone, and, when it is determined by said determining unit that it is allowed to change the output coefficient, said processing unit sets an output coefficient calculated by using the correlation coefficient of the plurality of channel signals, which is determined for the current zone, as the output coefficient of the mixed output signal for the current zone.

9. A coding device according to claim 6, wherein the regularity of the plurality of channel signals indicates the regularity of zone lengths.

10. A coding device according to claim 6, wherein an intermediate signal based on a sum of a left channel signal and a right channel signal and a side signal based on a difference between the left channel signal and the right channel signal are coded, and said processing unit multiplies the side signal by the output coefficient so as to obtain the mixed output signal.

11. A coding device according to claim 8, wherein the correlation coefficient is determined from standard deviations and covariance of the plurality of channel signals.

12. A coding device according to claim 6, wherein the channel signals are audio signals.

13. A coding device for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device comprising:
a correlation-coefficient determining unit for determining a new correlation coefficient by averaging a correlation coefficient of the plurality of channel signals for a current zone and at least one of a correlation coefficient of the plurality of channel signals for a past zone and a correlation coefficient of the plurality of channel signals for a future zone;
a channel signal mixing unit for mixing the plurality of channel signals based on at least one predetermined channel mixture ratio and outputting at least one mixed output signal;
a processing unit for setting an output coefficient determined from the new correlation coefficient as an output coefficient of the mixed output signal;
a quantizing unit for quantizing a spectrum signal obtained by performing spectrum transform on the mixed output signal using the output coefficient supplied from said processing unit; and
a coding unit for coding the signal quantized by said quantizing unit.

14. A coding device according to claim 13, wherein an intermediate signal based on a sum of a left channel signal and a right channel signal and a side signal based on a difference between the left channel signal and the right channel signal are coded, and said processing unit multiplies the side signal by the output coefficient so as to obtain the mixed output signal.

15. A coding device according to claim 13, wherein the correlation coefficient is determined from standard deviations and covariance of the plurality of channel signals.

16. A coding device according to claim 13, wherein the channel signals are audio signals.

17. A coding method for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device comprising:
a channel signal mixing step for mixing the plurality of channel signals based on at least one predetermined channel mixture ratio and outputting at least one mixed output signal;
a first processing step of setting an output coefficient calculated by using a correlation coefficient of the plurality of channel signals, which is determined for a previous zone, as an output coefficient of the mixed output signal for a current zone;
a second processing step of setting an output coefficient calculated by using a correlation coefficient of the plurality of channel signals, which is determined for the current zone, as the output coefficient of the mixed output signal for the current zone;
a first quantizing step of quantizing a spectrum signal obtained by performing spectrum transform on the mixed output signal using the output coefficient supplied from said first processing step;
a second quantizing step of quantizing a spectrum signal obtained by performing spectrum transform on the mixed output signal using the output coefficient supplied from said second processing step;
a selection control step of controlling the selection of an output of said first quantizing step and an output of said second quantizing step based on a result of comparing a quantization error in said first quantizing step with a quantization error in said second quantizing step; and
a coding step of coding the output of said first quantizing step or the output of said second quantizing step selected in said selection control step.

18. A coding method according to claim 17, wherein said selection control step performs control such that the output of said first quantizing step is selected when the quantization error in said second quantizing step is greater than the quantization error in said first quantizing step by a predetermined factor of the quantization error of said first quantizing step.

19. A coding method according to claim 17, wherein an intermediate signal based on a sum of a left channel signal and a right channel signal and a side signal based on a difference between the left channel signal and the right channel signal are coded, and said first processing step and said second processing step multiply the side signal by the output coefficient so as to obtain the mixed output signal.

20. A coding method according to claim 17, wherein the correlation coefficient is determined from standard deviations and covariance of the plurality of channel signals.

21. A coding method according to claim 17, wherein the channel signals are audio signals.

22. A coding method for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device comprising:
- a determining step of determining whether it is allowed to change an output coefficient based on a regularity of zone lengths of the plurality of channel signals;
- a channel signal mixing step for mixing the plurality of channel signals based on at least one predetermined channel mixture ratio and outputting at least one mixed output signal;
- a processing step of setting the output coefficient as an output coefficient of the mixed output signal;
- a quantizing step of quantizing a spectrum signal obtained by performing spectrum transform on the mixed output signal supplied from said processing step; and
- a coding step of coding the signal quantized in said quantizing step.

23. A coding method according to claim 22, wherein said determining step determines that it is not allowed to change the output coefficient when the plurality of channel signals have the regularity, and said determining step determines that it is allowed to change the output coefficient when the plurality of channel signals do not have the regularity.

24. A coding method according to claim 23, wherein, when it is determined by said determining step that it is not allowed to change the output coefficient, said processing step sets an output coefficient calculated by using a correlation coefficient of the plurality of channel signals, which is determined for a previous zone, as an output coefficient of the mixed output signal for a current zone, and, when it is determined by said determining step that it is allowed to change the output coefficient, said processing step sets an output coefficient calculated by using the correlation coefficient of the plurality of channel signals, which is determined for the current zone, as the output coefficient of the mixed output signal for the current zone.

25. A coding method according to claim 22, wherein the regularity of the plurality of channel signals indicates the regularity of zone lengths.

26. A coding method according to claim 22, wherein an intermediate signal based on a sum of a left channel signal and a right channel signal and a side signal based on a difference between the left channel signal and the right channel signal are coded, and said processing step multiplies the side signal by the output coefficient so as to obtain the mixed output signal.

27. A coding method according to claim 24, wherein the correlation coefficient is determined from standard deviations and covariance of the plurality of channel signals.

28. A coding method according to claim 22, wherein the channel signals are audio signals.

29. A coding method for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device comprising:
- a correlation-coefficient determining step of determining a new correlation coefficient by averaging a correlation coefficient of the plurality of channel signals for a current zone and at least one of a correlation coefficient of the plurality of channel signals for a past zone and a correlation coefficient of the plurality of channel signals for a future zone;
- a channel signal mixing step for mixing the plurality of channel signals based on at least one predetermined channel mixture ratio and outputting at least one mixed output signal;
- a processing step of setting an output coefficient determined from the new correlation coefficient as an output coefficient of the mixed output signal;
- a quantizing step of quantizing a spectrum signal obtained by performing spectrum transform on the mixed output signal using the output coefficient supplied from said processing step; and
- a coding step of coding the signal quantized in said quantizing step.

30. A coding method according to claim 29, wherein an intermediate signal based on a sum of a left channel signal and a right channel signal and a side signal based on a difference between the left channel signal and the right channel signal are coded, and said processing step multiplies the side signal by the output coefficient so as to obtain the mixed output signal.

31. A coding method according to claim 29, wherein the correlation coefficient is determined from standard deviations and covariance of the plurality of channel signals.

32. A coding method according to claim 29, wherein the channel signals are audio signals.

33. A recording medium in which a coded signal string is recorded, the coded signal string being coded and generated according to a coding method for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device, said coding method comprising:
- a channel signal mixing step for mixing the plurality of channel signals based on at least one predetermined channel mixture ratio and outputting at least one mixed output signal;
- a first processing step of setting an output coefficient calculated by using a correlation coefficient of the plurality of channel signals, which is determined for a previous zone, as an output coefficient of the mixed output signal for a current zone;
- a second processing step of setting an output coefficient calculated by using a correlation coefficient of the plurality of channel signals, which is determined for the current zone, as the output coefficient of the mixed output signal for the current zone;
- a first quantizing step of quantizing a spectrum signal obtained by performing spectrum transform on the mixed output signal using the output coefficient supplied from said first processing step;
- a second quantizing step of quantizing a spectrum signal obtained by performing spectrum transform on the mixed output signal using the output coefficient supplied from said second processing step;
- a selection control step of controlling the selection of an output of said first quantizing step and an output of said second quantizing step based on a result of comparing a quantization error in said first quantizing step with a quantization error in said second quantizing step; and a coding step of coding the output of said first quantizing step or the output of said second quantizing step selected in said selection control step.

34. A recording medium according to claim 33, wherein said selection control step performs control such that the output of said first quantizing step is selected when the quantization error in said second quantizing step is greater than the quantization error in said first quantizing step by a predetermined factor of the quantization error of said first quantizing step.

35. A recording medium according to claim 33, wherein a code string generated by coding an intermediate signal based on a sum of a left channel signal and a right channel signal and a side signal based on a difference between the left channel signal and the right channel signal is recorded, and said first processing step and said second processing step multiply the side signal by the output coefficient so as to obtain the mixed output signal.

36. A recording medium according to claim 33, wherein the correlation coefficient is determined from standard deviations and covariance of the plurality of channel signals.

37. A recording medium according to claim 33, wherein the channel signals are audio signals.

38. A recording medium in which a coded signal string is recorded, the coded signal string being coded and generated according to a coding method for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device, said coding method comprising:
    a determining step of determining whether it is allowed to change an output coefficient based on a regularity of zone lengths of the plurality of channel signals;
    a channel signal mixing step for mixing the plurality of channel signals based on at least one predetermined channel mixture ratio and outputting at least one mixed output signal;
    a processing step of setting the output coefficient as an output coefficient of the mixed output signal;
    a quantizing step of quantizing a spectrum signal obtained by performing spectrum transform on the mixed output signal supplied from said processing step; and
    a coding step of coding the signal quantized in said quantizing step.

39. A recording medium according to claim 38, wherein said determining step determines that it is not allowed to change the output coefficient when the plurality of channel signals have the regularity, and said determining step determines that it is allowed to change the output coefficient when the plurality of channel signals do not have the regularity.

40. A recording medium according to claim 39, wherein, when it is determined by said determining step that it is not allowed to change the output coefficient, said processing step sets an output coefficient calculated by using a correlation coefficient of the plurality of channel signals, which is determined for a previous zone, as an output coefficient of the mixed output signal for a current zone, and, when it is determined by said determining step that it is allowed to change the output coefficient, said processing step sets an output coefficient calculated by using the correlation coefficient of the plurality of channel signals, which is determined for the current zone, as the output coefficient of the mixed output signal for the current zone.

41. A recording medium according to claim 38, wherein the regularity of the plurality of channel signals indicates the regularity of zone lengths.

42. A recording medium according to claim 38, wherein a code string generated by coding an intermediate signal based on a sum of a left channel signal and a right channel signal and a side signal based on a difference between the left channel signal and the right channel signal is recorded, and said processing step multiplies the side signal by the output coefficient so as to obtain the mixed output signal.

43. A recording medium according to claim 40, wherein the correlation coefficient is determined from standard deviations and covariance of the plurality of channel signals.

44. A recording medium according to claim 38, wherein the channel signals are audio signals.

45. A recording medium in which a coded signal string is recorded, the coded signal string being coded and generated according to a coding method for mixing a plurality of channel signals every predetermined zone and for coding a resulting mixed output signal, a predetermined zone being a segment of time having a length separating successive peaks in the plurality of channel signals or a length separating successive zero-crossing positions in which each of the plurality of channel signals intersects with a zero level, the coding device, said coding method comprising:
    a correlation-coefficient determining step of determining a new correlation coefficient by averaging a correlation coefficient of the plurality of channel signals for a current zone and at least one of a correlation coefficient of the plurality of channel signals for a past zone and a correlation coefficient of the plurality of channel signals for a future zone;
    a channel signal mixing step for mixing the plurality of channel signals based on at least one predetermined channel mixture ratio and outputting at least one mixed output signal;
    a processing step of setting an output coefficient determined from the new correlation coefficient as an output coefficient of the mixed output signal;
    a quantizing step of quantizing a spectrum signal obtained by performing spectrum transform on the mixed output signal using the output coefficient supplied from said processing step; and
    a coding step of coding the signal quantized in said quantizing step.

46. A recording medium according to claim 45, wherein a code string generated by coding an intermediate signal based on a sum of a left channel signal and a right channel signal and a side signal based on a difference between the left channel signal and the right channel signal is recorded, and said processing step multiplies the side signal by the output coefficient so as to obtain the mixed output signal.

47. A recording medium according to claim 45, wherein the correlation coefficient is determined from standard deviations and covariance of the plurality of channel signals.

48. A recording medium according to claim 45, wherein the channel signals are audio signals.

* * * * *